US012479204B2

(12) United States Patent
Ito et al.

(10) Patent No.: US 12,479,204 B2
(45) Date of Patent: Nov. 25, 2025

(54) LIQUID EJECTION APPARATUS AND PRINT HEAD

(71) Applicant: SEIKO EPSON CORPORATION, Tokyo (JP)

(72) Inventors: Sukehiro Ito, Nagano (JP); Masayuki Kawakami, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 176 days.

(21) Appl. No.: 18/476,372

(22) Filed: Sep. 28, 2023

(65) Prior Publication Data

US 2024/0109305 A1 Apr. 4, 2024

(30) Foreign Application Priority Data

Sep. 30, 2022 (JP) ................................ 2022-157665

(51) Int. Cl.
*B41J 2/045* (2006.01)

(52) U.S. Cl.
CPC ....... *B41J 2/04563* (2013.01); *B41J 2/04541* (2013.01); *B41J 2/04581* (2013.01)

(58) Field of Classification Search
CPC ......................... B41J 2/04563; B41J 2/04541; B41J 2/04581; B41J 2002/14241; B41J 2002/14362; B41J 2002/14459; B41J 2/0455; B41J 2/04596; B41J 2002/14491; B41J 2/04588; B41J 2/04593; B41J 2/14233; B41J 2/14201; B41J 2002/14354
See application file for complete search history.

(56) References Cited

U.S. PATENT DOCUMENTS

2021/0197551 A1* 7/2021 Nozawa ............... B41J 2/04596
2022/0258472 A1 8/2022 Hirai et al.

FOREIGN PATENT DOCUMENTS

JP 2022-124599 A 8/2022
JP 2023012770 A * 1/2023 .......... B41J 2/14233

OTHER PUBLICATIONS

Ide Noritaka et al. (JP 2023012770 A), "Liquid Ejection Head Unit and Liquid Ejection Device", [Description of Embodiments—First Embodiment], Jan. 26, 2023. (Year: 2023).*

* cited by examiner

*Primary Examiner* — Lisa Solomon
(74) *Attorney, Agent, or Firm* — Global IP Counselors, LLP

(57) ABSTRACT

A liquid ejection apparatus includes a drive signal output circuit that outputs a drive signal and a print head that ejects a liquid, in which the print head includes a temperature detection portion that detects temperature information, the drive signal output circuit includes an amplification circuit that outputs an amplification modulation signal, a smoothing circuit that outputs the drive signal, and a basic drive signal output circuit that outputs a basic drive signal that is corrected based on the temperature information, and a frequency of the amplification modulation signal when the temperature detection portion detects the temperature information used for the basic drive signal output circuit to correct the basic drive signal is higher than a frequency of the amplification modulation signal when the temperature detection portion detects the temperature information not used for the basic drive signal output circuit to correct the basic drive signal.

10 Claims, 16 Drawing Sheets

| [LTa, LTb] ([SIH, SIL]) | S | | | |
|---|---|---|---|---|
| | t1(Q0) | t2(Q1) | t3(Q2) | t3(Q3) |
| [1, 1] | SP00 | SP10 | SP20 | SP30 |
| [1, 0] | SP01 | SP11 | SP21 | SP31 |
| [0, 1] | SP02 | SP12 | SP22 | SP32 |
| [0, 0] | SP03 | SP13 | SP23 | SP33 |

FIG. 11

| [LTa, LTb] ([SIH, SIL]) | S | | |
|---|---|---|---|
| | t1(Q0) | t2(Q1) | t3(Q2) |
| [1, 1] | 1 | 0 | 0 |
| [1, 0] | 0 | 1 | 0 |
| [0, 1] | 0 | 0 | 1 |
| [0, 0] | 0 | 0 | 0 |

LIQUID EJECTION APPARATUS AND PRINT HEAD

The present application is based on, and claims priority from JP Application Serial Number 2022-157665, filed Sep. 30, 2022, the disclosure of which is hereby incorporated by reference herein in its entirety.

BACKGROUND

1. Technical Field

The present disclosure relates to a liquid ejection apparatus and a print head.

2. Related Art

There is a liquid ejection apparatus that ejects a liquid having a configuration including a print head having a piezoelectric element, a pressure chamber, and a nozzle communicating with the pressure chamber. The print head changes a volume of the pressure chamber by driving the piezoelectric element, and ejects a liquid supplied to the pressure chamber from the nozzle. As a configuration of such a liquid ejection apparatus, there is a configuration that realizes ejection control suitable for a temperature of ink by driving and controlling a piezoelectric element based on the temperature of the ink stored in a print head. For example, JP-A-2022-124599 discloses a liquid ejection apparatus in which a temperature detection portion that detects a temperature of a pressure chamber storing ink is provided in a print head having a piezoelectric element, the pressure chamber, and a nozzle, and thus the detection accuracy of a temperature of the pressure chamber can be increased by reducing a temperature difference between a detected temperature and a temperature in the pressure chamber, and a liquid ejection head (print head).

However, in the liquid ejection apparatus disclosed in JP-A-2022-124599, since the temperature detection portion is provided inside the print head, the accuracy of detecting the temperature of the pressure chamber may be reduced, and thus there is room for further improvement.

SUMMARY

According to an aspect of the present disclosure, there is provided a liquid ejection apparatus including a drive signal output circuit that outputs a drive signal; and a print head that receives the drive signal and ejects a liquid, in which the print head includes a piezoelectric element that includes a first electrode, a second electrode, and a piezoelectric body and in which the piezoelectric body is located between the first electrode and the second electrode in a stacking direction in which the first electrode, the second electrode, and the piezoelectric body are stacked, and that is driven by receiving the drive signal, a vibration plate that is located on one side of the stacking direction with respect to the piezoelectric element and is deformed by driving the piezoelectric element, a pressure chamber substrate that is located on the one side of the stacking direction with respect to the vibration plate and is provided with a plurality of pressure chambers of which volumes change due to deformation of the vibration plate, a switch circuit that switches whether or not to supply the drive signal to the piezoelectric element, a wiring substrate that is provided with the switch circuit, and a temperature detection portion that is located on the other side of the stacking direction with respect to the vibration plate, is electrically coupled to the wiring substrate, and detects temperature information of the pressure chamber, the drive signal output circuit includes a modulation circuit that outputs a modulation signal obtained by modulating a basic drive signal that is a basis of the drive signal, an amplification circuit that outputs an amplification modulation signal obtained by amplifying the modulation signal, a smoothing circuit that outputs the drive signal obtained by smoothing the amplification modulation signal, a feedback circuit that feeds the drive signal back to the modulation circuit, and a basic drive signal output circuit that outputs the basic drive signal that is corrected based on the temperature information, and a frequency of the amplification modulation signal when the temperature detection portion detects the temperature information used for the basic drive signal output circuit to correct the basic drive signal is higher than a frequency of the amplification modulation signal when the temperature detection portion detects the temperature information not used for the basic drive signal output circuit to correct the basic drive signal.

According to another aspect of the present disclosure, there is provided that receives a drive signal output by a drive signal output circuit and ejects a liquid, the drive signal output circuit includes a modulation circuit that outputs a modulation signal obtained by modulating a basic drive signal, an amplification circuit that outputs an amplification modulation signal obtained by amplifying the modulation signal, a smoothing circuit that outputs the drive signal obtained by smoothing the amplification modulation signal, a feedback circuit that feeds the drive signal back to the modulation circuit, and a basic drive signal output circuit that outputs the basic drive signal that is corrected based on the temperature information output by the print head and is a basis of the drive signal, the print head includes a piezoelectric element that includes a first electrode, a second electrode, and a piezoelectric body and in which the piezoelectric body is located between the first electrode and the second electrode in a stacking direction in which the first electrode, the second electrode, and the piezoelectric body are stacked, and that is driven by receiving the drive signal, a vibration plate that is located on one side of the stacking direction with respect to the piezoelectric element and is deformed by driving the piezoelectric element, a pressure chamber substrate that is located on the one side of the stacking direction with respect to the vibration plate and is provided with a plurality of pressure chambers of which volumes change due to deformation of the vibration plate, a switch circuit that switches whether or not to supply the drive signal to the piezoelectric element, a wiring substrate that is provided with the switch circuit, and a temperature detection portion that is located on the other side of the stacking direction with respect to the vibration plate, is electrically coupled to first wiring substrate, and detects temperature information of the pressure chamber, in which a frequency of the amplification modulation signal when the temperature information detected by the temperature detection portion is output to the basic drive signal output circuit is higher than a frequency of the amplification modulation signal when the temperature information detected by the temperature detection portion is not output to the basic drive signal output circuit.

BRIEF DESCRIPTION OF THE DRAWINGS

FIG. 11 is a diagram illustrating a specific example of decoding contents of the decoder.

DESCRIPTION OF EMBODIMENTS

Hereinafter, preferred embodiments of the present disclosure will be described with reference to the drawings. The drawings used are for convenience of description. The embodiments described below do not unreasonably limit the content of the present disclosure described in the claims. Not all of the configurations described below are essential constituent requirements of the present disclosure.

1. STRUCTURE OF LIQUID EJECTION APPARATUS

Figure 1:
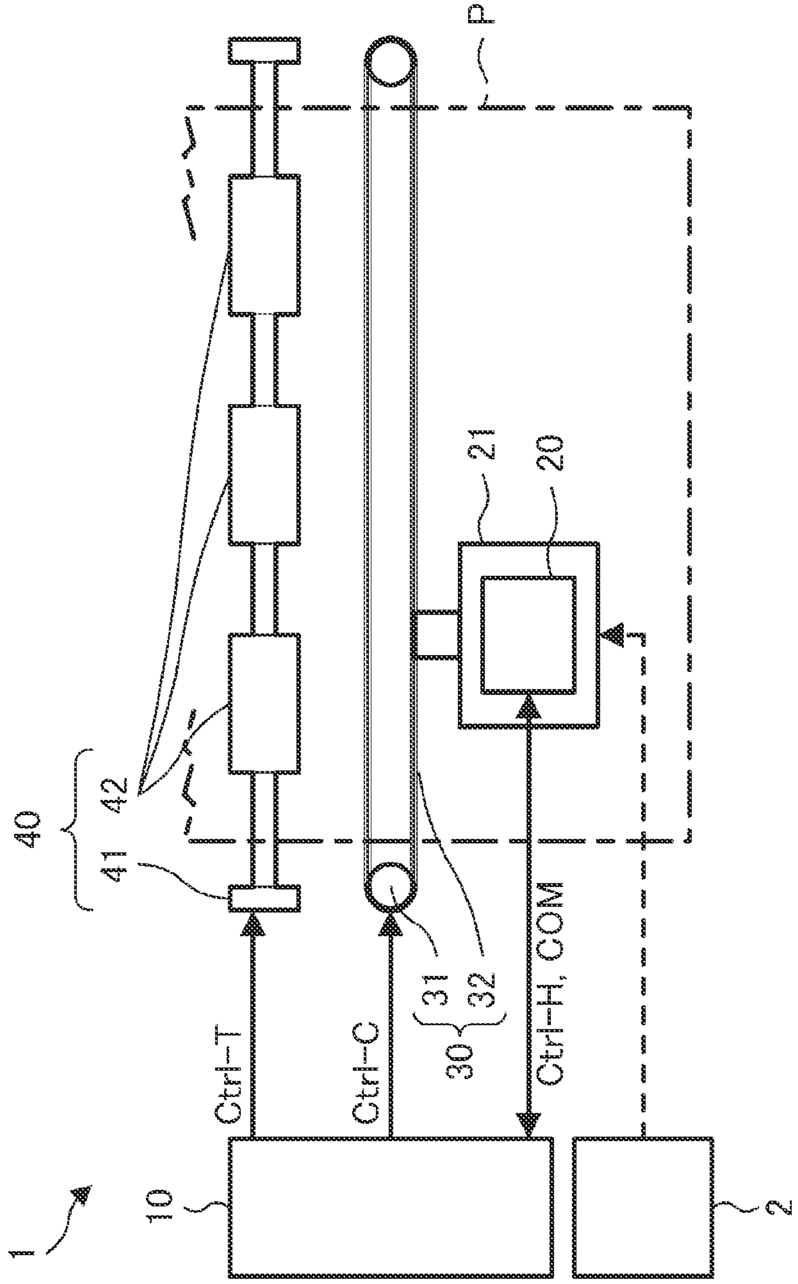
FIG. 1 is a diagram illustrating a schematic configuration of a liquid ejection apparatus.

FIG. 1 is a diagram illustrating a schematic configuration of a liquid ejection apparatus 1. The liquid ejection apparatus 1 according to the present embodiment will be described by using an example of a serial printing type ink jet printer in which a carriage 21 on which a print head 20 ejecting ink as an example of a liquid is mounted reciprocates along a scanning axis and ejects the ink to a medium P that is transported in a transport direction to form an image on the medium P. As the medium P used in such a liquid ejection apparatus 1, any printing target such as a printing paper, a resin film, or a cloth may be used.

As illustrated in FIG. 1, the liquid ejection apparatus 1 includes an ink container 2, a control mechanism 10, a carriage 21, a movement mechanism 30, and a transport mechanism 40.

A plurality of types of ink to be ejected to the medium P are stored in the ink container 2. Examples of colors of the ink stored in the ink container 2 include black, cyan, magenta, yellow, red, and gray. As the ink container 2 in which such ink is stored, an ink cartridge, a bag-shaped ink pack made of a flexible film, an ink tank capable of replenishing ink, and the like may be used.

The control mechanism 10 includes a processing circuit such as a central processing unit (CPU) or a field programmable gate array (FPGA), and a memory circuit such as a semiconductor memory, and controls each element of the liquid ejection apparatus 1 including the print head 20.

In a state in which the print head 20 is mounted on the carriage 21, the carriage 21 is fixed to an endless belt 32 included in the movement mechanism 30. The ink container 2 may be mounted on the carriage 21.

A control signal Ctrl-H for controlling the print head 20 output from the control mechanism 10 and a drive signal COM for driving the print head 20 are input to the print head 20 mounted on the carriage 21. The ink stored in the ink container 2 is supplied to the print head 20 via a tube (not illustrated). The print head 20 ejects the ink supplied from the ink container 2 based on the input control signal Ctrl-H a drive signal COM.

The movement mechanism 30 includes a carriage motor 31 and the endless belt 32. The carriage motor 31 is operated based on a control signal Ctrl-C input from the control mechanism 10. The endless belt 32 is rotated according to an operation of the carriage motor 31. Consequently, the carriage 21 fixed to the endless belt 32 reciprocates in the scanning axis. That is, the carriage 21 reciprocates along the scanning axis intersecting the transport direction in which the medium P is transported.

The transport mechanism 40 includes a transport motor 41 and a transport roller 42. The transport motor 41 is operated based on a control signal Ctrl-T input from the control mechanism 10. The transport roller 42 is rotated in accordance with the operation of the transport motor 41. The medium P is transported in the transport direction in accordance with the rotation of the transport roller 42.

As described above, the liquid ejection apparatus 1 ejects the ink from the print head 20 mounted on the carriage 21 onto the medium P in conjunction with the transporting of the medium P using the transport mechanism 40 and the reciprocation of the carriage 21 by the movement mechanism 30, and thus the ink is landed at a predetermined position on a surface of the medium P to form a desired image on the medium P.

2. FUNCTIONAL CONFIGURATION OF LIQUID EJECTION APPARATUS

Figure 2:
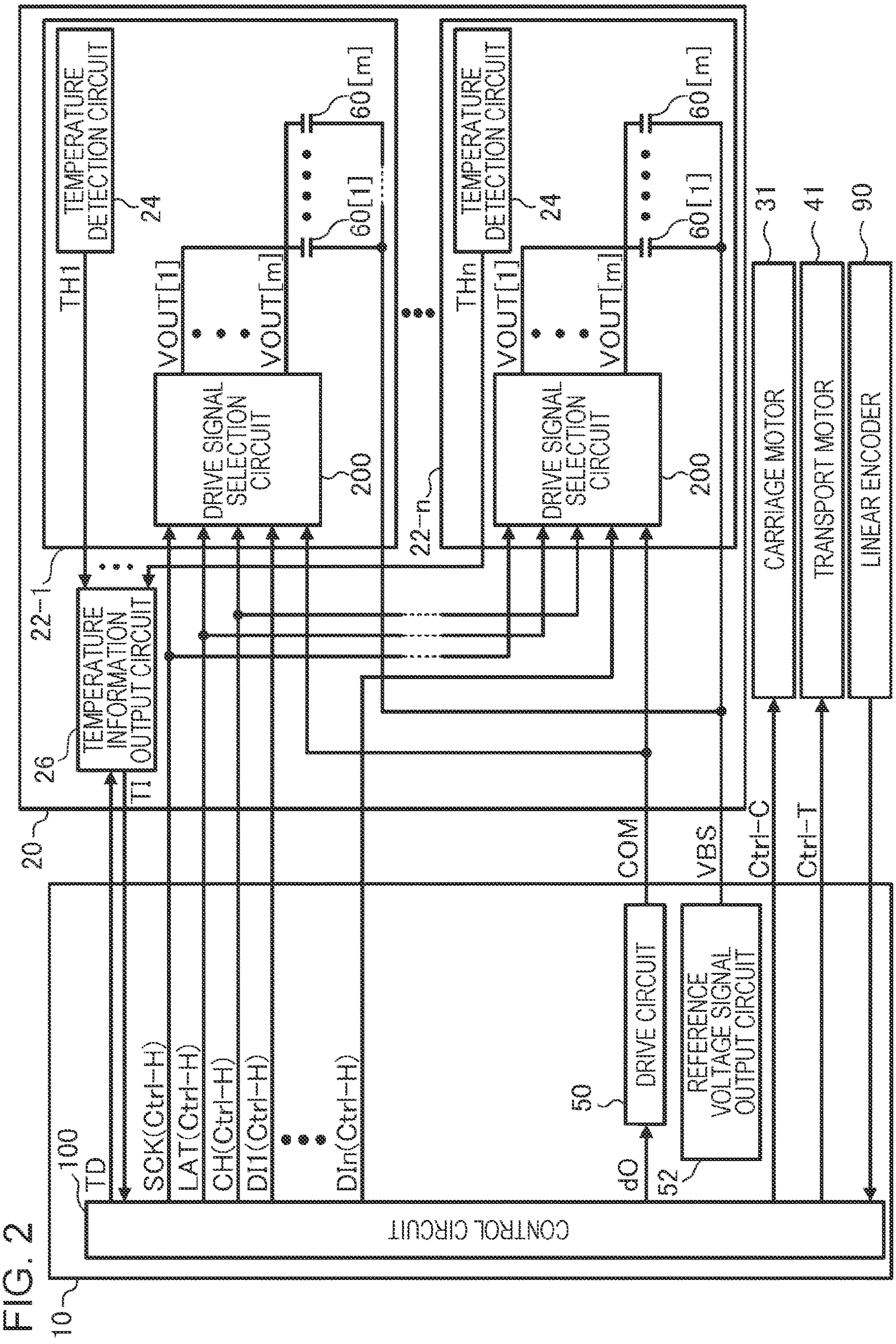
FIG. 2 is a diagram illustrating a functional configuration of the liquid ejection apparatus.

Next, a functional configuration of the liquid ejection apparatus 1 will be described. FIG. 2 is a diagram illustrating a functional configuration of the liquid ejection apparatus 1. As illustrated in FIG. 2, the liquid ejection apparatus 1 includes the control mechanism 10, the print head 20, the carriage motor 31, the transport motor 41, and a linear encoder 90.

The control mechanism 10 includes a drive circuit 50, a reference voltage signal output circuit 52, a frequency measurement circuit 54, and a control circuit 100. For example, the control circuit 100 includes a processing circuit such as a CPU and an FPGA and a storage circuit such as a semiconductor memory. An image information signal including image data or the like is input to the control circuit 100 from an external apparatus such as a host computer that is communicatively connected to the outside of the liquid ejection apparatus 1. The control circuit 100 generates various signals for controlling the liquid ejection apparatus 1 based on the input image information signal, and outputs the various signals to corresponding configurations.

As a specific example, in addition to the image information signal described above, a detection signal based on a scanning position of the carriage 21 is input from the linear encoder 90 to the control circuit 100. The control circuit 100 ascertains a scanning position of the print head 20 mounted on the carriage 21 based on the input detection signal. The control circuit 100 generates and outputs various signals according to the scanning position of the print head 20 and the image information signal.

Specifically, the control circuit 100 generates the control signal Ctrl-C for controlling movement of the print head 20 along the scanning axis according to the scanning position of the print head 20, and outputs the control signal Ctrl-C to the carriage motor 31. As a result, the carriage motor 31 is operated, and movement of the print head 20 mounted on the carriage 21 along the scanning axis and a scanning position thereof are controlled. The control circuit 100 generates the control signal Ctrl-T for controlling transport of the medium P, and outputs the control signal Ctrl-T to the transport motor 41. As a result, the transport motor 41 is operated, and movement of the medium P in the transport direction is controlled. The control signal Ctrl-C may be input to the carriage motor 31 after being signal-converted via a driver circuit (not illustrated). Similarly, the control signal Ctrl-T may be input to the transport motor 41 after being signal-converted via a driver circuit (not illustrated).

The control circuit 100 generates head control signals DI1 to DIn, a change signal CH, a latch signal LAT, and a clock signal SCK as the control signals Ctrl-H for controlling the print head 20 based on the image information signal input from the external apparatus and the scanning position of the print head 20 input from the linear encoder 90, and outputs these signals to the print head 20.

The control circuit 100 outputs a basic drive signal dO, which is a digital signal, to the drive circuit 50. The drive circuit 50 performs digital/analog conversion of the input basic drive signal dO, then amplifies the converted analog signal in class D to generate the drive signal COM, and outputs the drive signal COM to the print head 20. That is, the basic drive signal dO output by the control circuit 100 is a digital signal that defines a waveform of the drive signal COM. The basic drive signal dO may be any signal that can define a waveform of the drive signal COM output by the drive circuit 50, and may be an analog signal. The details of the drive circuit 50 will be described later.

The reference voltage signal output circuit 52 generates a reference voltage signal VBS and outputs the reference voltage signal VBS to the print head 20. The reference voltage signal VBS output by the reference voltage signal output circuit 52 may be a signal having a potential that is a reference for driving a piezoelectric element 60 that will be described later, and may be, for example, a signal constant at the ground potential, and may be a constant DC voltage signal at a potential of 5.5 V, 6 V, or the like. The reference voltage signal output circuit 52 may be integrally configured with the drive circuit 50.

The frequency measurement circuit 54 detects a frequency of the amplification modulation signal AMs output by the drive circuit 50. The frequency measurement circuit 54 generates a frequency determination signal Fm that is set to an H level for a certain period when a frequency of the detected amplification modulation signal AMs reaches the maximum value, and outputs the frequency determination signal Fm to the control circuit 100. The control circuit 100 calculates a voltage value of the drive signal COM at the moment at which the input frequency determination signal Fm reaches an H level based on the basic drive signal dO output to the drive circuit 50, and stores a calculation result. The frequency determination signal Fm output by the frequency measurement circuit 54 is not limited to a signal set to an H level when a frequency of the measured amplification modulation signal AMs is the maximum, and may be a signal set to an H level when a frequency of the measured amplification modulation signal AMs is equal to or more than a predetermined threshold value.

The control circuit 100 generates a temperature acquisition request signal TD for acquiring the temperature of the print head 20 at a predetermined timing, and outputs the temperature acquisition request signal TD to the print head 20. A temperature information signal TI output by the print head 20 is input to the control circuit 100 in response to the temperature acquisition request signal TD. That is, the temperature information signal TI including information regarding the temperature of the print head 20 is input to the control circuit 100. The control circuit 100 corrects the control signals Ctrl-H, Ctrl-C, and Ctrl-T and the basic drive signal dO based on the input temperature information signal TI. That is, the control circuit 100 outputs the basic drive signal dO corrected based on the temperature information signal TI.

The print head 20 includes ejection modules 22-1 to **22-*n* and a temperature information output circuit 26. Each of the ejection modules 22-1 to 22-*n* includes a drive signal selection circuit 200, a temperature detection circuit 24, and piezoelectric elements 60[1] to 60**[*m*].

The head control signal DI1, the change signal CH, the latch signal LAT, and the clock signal SCK output by the control circuit 100, the drive signal COM output by the drive circuit 50, and the reference voltage signal VBS output by the reference voltage signal output circuit 52 are input to the ejection module 22-1.

The clock signal SCK, the latch signal LAT, the change signal CH, the head control signal DI1, and the drive signal COM input to the ejection module 22-1 are input to each of the drive signal selection circuits 200. The drive signal selection circuit 200 selects or does not select a signal waveform of the drive signal COM based on the input clock signal SCK, latch signal LAT, change signal CH, and head control signal DI1, and thus generates drive signals VOUT [1] to VOUT[m]. The drive signal selection circuit 200 individually outputs the generated drive signals VOUT[1] to VOUT[m] to first ends of the corresponding piezoelectric elements 60[1] to 60[*m*]. The reference voltage signal VBS is commonly input to second ends of the piezoelectric elements 60[1] to 60[*m*]. The piezoelectric elements 60[1] to 60[*m*] are driven according to potential differences between the drive signals VOUT[1] to VOUT[m] individually input to the first ends and the reference voltage signal VBS commonly input to the second ends. An amount of ink corresponding to driving of each of the piezoelectric elements 60[1] to 60[*m*] is ejected from the ejection module 22-1.

Here, in the print head 20 of the present embodiment, a description will be made assuming that the drive signal VOUT[1] corresponds to the piezoelectric element 60[1], and the drive signal VOUT[m] corresponds to the piezoelectric element 60[*m*]. That is, the description will be made assuming that the drive signal VOUT[1] generated by the drive signal selection circuit 200 is input to the first end of the piezoelectric element 60[1], and the drive signal VOUT [m] generated by the drive signal selection circuit 200 is input to the first end of the piezoelectric element 60 [m].

The piezoelectric elements 60[1] to 60[*m*] all have the same configuration, and may be referred to as a piezoelectric element 60 when it is not necessary to distinguish the piezoelectric elements. In this case, a description will be made assuming that the drive signal VOUT is supplied as the drive signals VOUT[1] to VOUT[m] to the first end of the piezoelectric element 60. That is, the description will be made assuming that the piezoelectric element 60 is driven according to a potential difference between the drive signal VOUT supplied to the first end and the reference voltage signal VBS supplied to a second end.

The temperature detection circuit 24 included in the ejection module 22-1 detects the temperature of the ejection module 22-1. The temperature detection circuit 24 outputs the detected temperature of the ejection module 22-1 to the temperature information output circuit 26 as temperature detection information TH1.

Here, the ejection module 22-2 to the ejection module 22-*n* have the same configuration as the ejection module 22-1 except that the input signals and the output signals are different, and perform the same operation.

That is, the clock signal SCK, the latch signal LAT, the change signal CH, the head control signal DIn, the drive signal COM, and the reference voltage signal VBS are input to the ejection module 22-*n*. The drive signal selection circuit 200 included in the ejection module 22-*n* selects or does not select the drive signal COM based on the input clock signal SCK, latch signal LAT, change signal CH, and input head control signal DIn, to generate the drive signals VOUT[1] to VOUT[m]. The drive signals VOUT[1] to VOUT[m] generated by the drive signal selection circuit 200 included in the ejection module 22-*n* are input to the first ends of the corresponding piezoelectric elements 60[1] to 60[*m*] included in the ejection module 22-*n*. A reference voltage signal VBS is commonly input to second ends of the piezoelectric elements 60[1] to 60[*m*] included in the ejection module 22-*n*. As a result, the piezoelectric elements 60[1] to 60[*m*] of the ejection module 22-*n* are driven, and an amount of ink corresponding to driving of the piezoelectric elements 60[1] to 60[*m*] is ejected from the ejection module 22-*n*. The temperature detection circuit 24 included in the ejection module 22-*n* detects the temperature of the ejection module 22-*n* and outputs the detected temperature as temperature detection information THn.

Therefore, in the following description, when it is not necessary to distinguish the ejection modules 22-1 to 22-*n*, the ejection modules may be simply referred to as an ejection module 22. In this case, a description will be made assuming that the clock signal SCK, the latch signal LAT, the change signal CH, the head control signal DI, the drive signal COM, and the reference voltage signal VBS are input to the ejection module 22, and the temperature detection information TH indicating the temperature of the ejection module 22 is output.

The pieces of temperature detection information TH1 to THn output by the temperature detection circuits 24 included in each of the ejection modules 22-1 to 22-*n* and the temperature acquisition request signal TD output by the control circuit 100 are input to the temperature information output circuit 26. The temperature information output circuit 26 amplifies and stores each of the pieces of temperature detection information TH1 to THn. The temperature information output circuit 26 outputs, as the temperature information signal TI, a corresponding signal among signals obtained by amplifying each of the pieces of temperature detection information TH1 to THn stored in accordance with the temperature acquisition request signal TD input from the control circuit 100. Such a temperature information output circuit 26 includes an amplification circuit that amplifies the pieces of temperature detection information TH1 to THn, a processor such as a microcomputer that receives the input temperature acquisition request signal TD and outputs the temperature information signal TI obtained by amplifying the temperature detection information TH1 to THn, and a storage circuit that amplifies and stores each of the pieces of temperature detection information TH1 to THn.

The temperature information output circuit 26 may store each of the pieces of temperature detection information TH1 to THn output by the temperature detection circuits 24 included in the respective ejection modules 22-1 to 22-*n*, amplify each of the stored pieces of temperature detection information TH1 to THn according to the temperature acquisition request signal TD input from the control circuit 100, and output the amplified signal as the temperature information signal TI.

As described above, the liquid ejection apparatus 1 of the present embodiment includes the drive circuit 50 that outputs the drive signal COM, and the print head 20 that receives the drive signal COM and ejects ink. In other words, the print head 20 receives the drive signal COM output by the drive circuit 50 and ejects the ink.

3. CONFIGURATION OF DRIVE CIRCUIT

Figure 3:
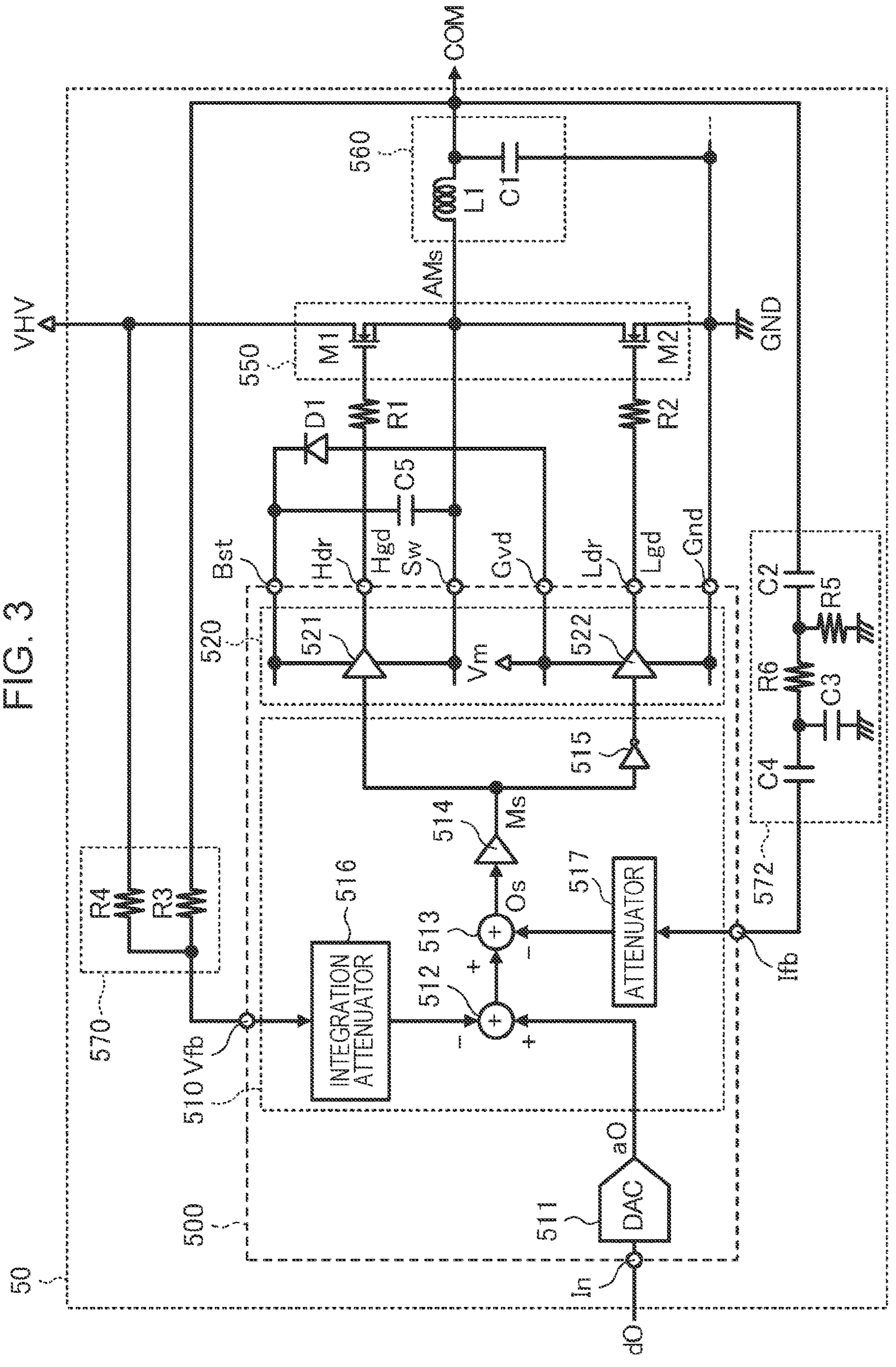
FIG. 3 is a diagram illustrating a configuration of a drive circuit.

Next, a configuration and an operation of the drive circuit 50 that outputs the drive signal COM will be described. FIG. 3 is a diagram illustrating a configuration of the drive circuit 50. The drive circuit 50 includes an integrated circuit 500, an amplification circuit 550, a smoothing circuit 560, feedback circuits 570 and 572, and other electronic components. FIG. 3 also illustrates the frequency measurement circuit 54 that measures a frequency of the amplification modulation signal AMs output by the drive circuit 50.

The integrated circuit 500 has a plurality of terminals including a terminal In, a terminal Bst, a terminal Hdr, a terminal Sw, a terminal Gvd, a terminal Ldr, a terminal Gnd, a terminal Vfb, and a terminal Ifb. The integrated circuit 500 is electrically coupled to an externally provided substrate (not illustrated) via the plurality of terminals. The integrated circuit 500 includes a digital to analog converter (DAC) 511, a modulation circuit 510, and a gate drive circuit 520.

The DAC 511 converts the input basic drive signal dO of a digital signal into a basic drive signal aO of an analog signal, and outputs the basic drive signal aO to the modulation circuit 510. A signal obtained by amplifying the basic drive signal aO output by the DAC 511 corresponds to the drive signal COM. That is, the basic drive signal aO corresponds to a target signal before amplification of the drive signal COM, and the basic drive signals dO and aO are signals defining a signal waveform of the drive signal COM.

The modulation circuit 510 generates a modulation signal Ms obtained by modulating the basic drive signal aO and outputs the modulation signal Ms to the gate drive circuit 520. The modulation circuit 510 includes adders 512 and 513, a comparator 514, an inverter 515, an integration attenuator 516, and an attenuator 517.

The integration attenuator 516 attenuates and integrates the drive signal COM input via the terminal Vfb and outputs the drive signal COM to an input terminal on the negative side of the adder 512. The basic drive signal aO is input to an input terminal on the positive side of the adder 512. The adder 512 outputs a voltage obtained by subtracting and integrating a voltage input to the input terminal on the negative side from a voltage input to the input terminal on the positive side to an input terminal on the positive side of the adder 513.

The attenuator 517 outputs a voltage obtained by attenuating a high frequency component of the drive signal COM input via the terminal Ifb to the input terminal on the negative side of the adder 513. The voltage output from the adder 512 is input to the input terminal on the positive side of the adder 513. The adder 513 generates a voltage signal Os obtained by subtracting the voltage input to the input terminal on the negative side from the voltage input to the input terminal on the positive side, and outputs the voltage signal Os to the comparator 514.

The comparator 514 outputs the modulation signal Ms obtained by pulse-modulating the voltage signal Os input from the adder 513. Specifically, the comparator 514 generates and outputs the modulation signal Ms that has an H level when a voltage value of the voltage signal Os input from the adder 513 is a predetermined threshold value Vth1 or greater in a case where the voltage value increases, and that has an L level when the voltage value of the voltage signal Os is smaller than a predetermined threshold value Vth2 in a case where the voltage value decreases. Here, for the threshold values Vth1 and Vth2, the threshold value Vth1 the threshold value Vth2.

The modulation signal Ms output by the comparator 514 is input to a gate driver 521 included in the gate drive circuit 520, and is also input to a gate driver 522 included in the gate drive circuit 520 via the inverter 515. That is, signals having a relationship in which the logic levels are exclusive are input to the gate driver 521 and the gate driver 522. Here, the relationship in which the logic levels are exclusive includes that the logic levels of the signals input to the gate driver 521 and the gate driver 522 are not simultaneously in an H level. Therefore, the modulation circuit 510 may include a timing control circuit controlling timings of the modulation signal Ms input to the gate driver 521 and the signal in which the logic level of the modulation signal Ms input to the gate driver 522 is inverted, instead of or in addition to the inverter 515.

The gate drive circuit 520 includes the gate driver 521 and the gate driver 522. The gate driver 521 level-shifts the modulation signal Ms output from the comparator 514 to generate an amplification control signal Hgd, and outputs the amplification control signal Hgd from the terminal Hdr.

Specifically, within a power supply voltage for the gate driver 521, a voltage is supplied to the high level side via the terminal Bst, and a voltage is supplied to the low level side via the terminal Sw. The terminal Bst is coupled to a first end of a capacitor C5 and a cathode of a diode D1 for preventing backflow. The terminal Sw is coupled to a second end of the capacitor C5. An anode of the diode D1 is coupled to the terminal Gvd. A voltage signal Vm, which is a DC voltage of, for example, 7.5 V, output by a power supply circuit (not illustrated) is supplied to the terminal Gvd. That is, the voltage signal Vm is supplied to the anode of the diode D1. Therefore, a potential difference between the terminal Bst and the terminal Sw is approximately equal to a voltage value of the voltage signal Vm. As a result, the gate driver 521 generates the amplification control signal Hgd having a voltage value greater than that of the terminal Sw by the voltage signal Vm according to the input modulation signal Ms, and outputs the amplification control signal Hgd from the terminal Hdr.

The gate driver 522 is operated on the lower potential side than the gate driver 521. The gate driver 522 level-shifts the signal in which the logic level of the modulation signal Ms output from the comparator 514 is inverted by the inverter 515 to generate an amplification control signal, and outputs the amplification control signal Lgd from the terminal Ldr.

Specifically, within a power supply voltage for the gate driver 522, the voltage signal Vm is supplied to the high level side, and a ground potential is supplied to the low level side via the terminal Gnd. The gate driver 522 outputs, from the terminal Ldr, the amplification control signal Lgd having a voltage value greater than that of the terminal Gnd by the voltage signal Vm according to the signal in which the logic level of the input modulation signal Ms is inverted. Here, the ground potential is a reference potential of the drive circuit 50, and is, for example, 0 V.

The amplification circuit 550 includes a transistor M1 and a transistor M2.

The transistor M1 is a surface mount-type field effect transistor (FET), and a voltage signal VHV, which is a DC voltage of, for example, 42 V, is supplied to a drain of the transistor M1 as a power supply voltage for amplification of the amplification circuit 550. A gate of the transistor M1 is electrically coupled to a first end of a resistor R1 and a second end of the resistor R1 is electrically coupled to the terminal Hdr of the integrated circuit 500. That is, the amplification control signal Hgd is input to the gate of the transistor M1. A source of the transistor M1 is electrically coupled to the terminal Sw of the integrated circuit 500.

The transistor M2 is a surface mount-type FET, and a drain of the transistor M2 is electrically coupled to the terminal Sw of the integrated circuit 500. That is, the drain of the transistor M2 and the source of the transistor M1 are electrically coupled to each other. A gate of the transistor M2 is electrically coupled to a first end of a resistor R2, and a second end of the resistor R2 is electrically coupled to the terminal Ldr of the integrated circuit 500. That is, the amplification control signal Lgd is input to the gate of the transistor M2. A ground potential is supplied to a source of the transistor M2.

On the other hand, when the drain and the source of the transistor M1 are controlled to be conductive and the drain and the source of the transistor M2 are controlled to be non-conductive, a potential of a node coupled to the terminal Sw becomes the ground potential. Therefore, the voltage signal Vm is supplied to the terminal Bst. On the other hand, when the drain and the source of the transistor M1 are controlled to be conductive and the drain and the source of the transistor M2 are controlled to be non-conductive, the potential of the node coupled to which the terminal Sw has a voltage value of the voltage signal VHV. Therefore, a voltage corresponding to a potential of a sum of the voltage value of the voltage signal VHV and the voltage value of the voltage signal Vm is supplied to the terminal Bst. That is, the gate driver 521 that drives the transistor M1 generates the amplification control signal Hgd of which an L level is a voltage value of the voltage signal VHV and an H level is a voltage value corresponding to a sum of the voltage value of a voltage signal VHV and a voltage value of the voltage signal Vm when a potential of the terminal Sw is changed to the ground potential or the voltage signal VHV according to operations of the transistor M1 and the transistor M2 with the capacitor C5 as a floating power supply, and outputs the amplification control signal Hgd to the gate of the transistor M1.

On the other hand, the gate driver 522 that drives the transistor M2 generates an amplification control signal Lgd of which an L level is the ground potential and an H level is the voltage value of the voltage signal Vm, regardless of operations of the transistor M1 and the transistor M2 and outputs the amplification control signal Lgd to the gate of the transistor M2.

The amplification circuit 550 configured as described above generates an amplification modulation signal AMs obtained by amplifying the modulation signal Ms based on the voltage signal VHV at a coupling point between the source of the transistor M1 and the drain of the transistor M2. The amplification circuit 550 outputs the generated amplification modulation signal AMs to the smoothing circuit 560 and also outputs the generated amplification modulation signal AMs to the frequency measurement circuit 54.

Here, a capacitor C7 is provided in a propagation path through which the voltage signal VHV input to the amplification circuit 550 propagates. Specifically, a first end of the capacitor C7 is electrically coupled to the drain of the transistor M1 on the propagation path through which the voltage signal VHV propagates, and, the ground potential GND is supplied to a second end of the capacitor C7. Consequently, a probability that a voltage value of the voltage signal VHV input to the amplification circuit 550 varies is reduced, a probability that noise is superimposed on the voltage signal VHV is reduced, and as a result, the waveform accuracy of the amplification modulation signals AMs output by the amplification circuit 550 is improved. Thus, an electrolytic capacitor having a high breakdown voltage and a large capacity is used. The capacitor C7 may be provided to correspond to one drive circuit 50, or may be provided to correspond to a plurality of drive circuits 50.

The smoothing circuit 560 generates the drive signal COM by demodulating the amplification modulation signal AMs output by the amplification circuit 550, and outputs the drive signal COM from the drive circuit 50. The smoothing circuit 560 includes an inductor L1 and a capacitor C1. A first end of the inductor L1 is coupled to a first end of the capacitor C1. The amplification modulation signal AMs is input to a second end of the inductor L1. The ground potential is supplied to a second end of the capacitor C1. That is, in the smoothing circuit 560, the inductor L1 and the capacitor C1 form a low-pass filter. The smoothing circuit 560 demodulates the amplification modulation signal AMs by smoothing the amplification modulation signal AMs with the low-pass filter, and outputs the demodulated signal as the drive signal COM. That is, the drive circuit 50 outputs the drive signal COM from the first end of the inductor L1 and the first end of the capacitor C1 included in the smoothing circuit 560.

The feedback circuit 570 includes a resistor R3 and a resistor R4. The drive signal COM is supplied to a first end of the resistor R3, and a second end thereof is coupled to the terminal Vfb and a first end of the resistor R4. The voltage signal VHV is supplied to a second end of the resistor R4. Consequently, the drive signal COM that has passed through the feedback circuit 570 is fed back to the terminal Vfb in a state of being pulled up by the voltage value of the voltage signal VHV.

The feedback circuit 572 includes capacitors C2, C3, and C4 and resistors R5 and R6. The drive signal COM is input to a first end of the capacitor C2, and a second end thereof is coupled to a first end of the resistor R5 and a first end of the resistor R6. The ground potential is supplied to a second end of the resistor R5. Consequently, the capacitor C2 and the resistor R5 function as a high-pass filter. A second end of the resistor R6 is coupled to the first end of the capacitor C4 and the first end of the capacitor C3. The ground potential is supplied to a second end of the capacitor C3. Consequently, the resistor R6 and the capacitor C3 function as a low-pass filter. That is, the feedback circuit 572 includes a high-pass filter and a low-pass filter, and functions as a band-pass filter through which a signal in a predetermined frequency range included in the drive signal COM passes.

A second end of the capacitor C4 is coupled to the terminal Ifb of the integrated circuit 500. As a result, among high frequency components of the drive signal COM that has passed through the feedback circuit 572 that functions as a band-pass filter, a signal of which a DC component is cut is fed back to the terminal Ifb.

The drive signal COM is a signal obtained by the smoothing circuit 560 smoothing the amplification modulation signal AMs based on the basic drive signal do. The drive signal COM is integrated and subtracted via the terminal Vfb, and then fed back to the adder 512. As a result, the drive circuit 50 self-oscillates at a frequency determined by a feedback delay and a feedback transfer function. However, the feedback path via the terminal Vfb has a large delay amount. Therefore, it may not be possible to increase a frequency of self-oscillation to such an extent that the accuracy of the drive signal COM can be sufficiently ensured only by feedback via the terminal Vfb. Therefore, by providing a path for feeding back the high frequency component of the drive signal COM via the terminal Ifb separately from the path via the terminal Vfb, the delay in the entire circuit is reduced. As a result, a frequency of the voltage signal Os can be increased to such an extent that the accuracy of the drive signal COM can be sufficiently ensured compared with the case where the path via the terminal Ifb does not exist.

As described above, the drive circuit 50 includes the modulation circuit 510 that outputs the modulation signal Ms obtained by modulating the basic drive signal dO that is a base of the drive signal COM, the amplification circuit 550 that outputs the amplification modulation signal AMs obtained by amplifying the modulation signal Ms, the smoothing circuit 560 that outputs the drive signal COM obtained by smoothing the amplification modulation signal AMs, and the feedback circuits 570 and 572 that feed the drive signal COM back to the modulation circuit 510. The drive circuit 50 generates the drive signal COM by performing digital/analog conversion on the input basic drive signal dO and then amplifying the analog signal in class D, and outputs the generated drive signal COM. That is, the drive circuit 50 includes a class-D amplification circuit, and the print head 20 receives the drive signal COM output by the drive circuit 50 including the class-D amplification circuit and ejects ink.

The frequency measurement circuit 54 detects a frequency of the amplification modulation signal AMs output by the amplification circuit 550. The frequency measurement circuit 54 generates a frequency determination signal Fm that is set to an H level for a certain period when a frequency of the detected amplification modulation signal AMs reaches the maximum value, and outputs the frequency determination signal Fm to the control circuit 100.

Here, a relationship between a frequency of the amplification modulation signal AMs and a voltage value of the drive signal COM will be described.

As described above, the drive circuit 50 of the present embodiment self-oscillates at a frequency determined by a feedback delay of the feedback circuits 570 and 572 and a feedback transfer function. The frequency of self-oscillation of the drive circuit 50 is a switching frequency of the amplification circuit 550 and corresponds to a frequency of the amplification modulation signal AMs. In such a self-oscillation circuit, the frequency of the self-oscillation corresponds to a voltage value between the maximum voltage and the minimum voltage of an output signal from the viewpoint of circuit efficiency, waveform accuracy of the output signal, and operational stability, and is preferably maximum in the vicinity of an average voltage between the maximum voltage and the minimum voltage, and the frequency decreases as the voltage value increases or decreases.

In view of such frequency characteristics of the drive circuit 50, the frequency measurement circuit 54 detects a frequency of the amplification modulation signal AMs, generates the frequency determination signal Fm that is set to an H level for a certain period at the moment at which the detected frequency changes from an increase to a decrease, and outputs the generated frequency determination signal Fm to the control circuit 100. In this case, the frequency measurement circuit 54 may detect a frequency of the amplification modulation signal AMs, calculate a moving average of the detected frequency, generate the frequency determination signal Fm that is set to an H level at the moment at which a value of the calculated moving average changes from rising to falling, and output the generated frequency determination signal Fm to the control circuit 100.

The frequency measurement circuit 54 may be controlled not to output the frequency determination signal Fm with an H level when a voltage value of the drive signal COM is not within a predetermined range or when a frequency of the amplification modulation signal AMs is lower than a predetermined frequency. As a result, the detection accuracy of the maximum value of the frequency of the amplification modulation signal AMs in the frequency measurement circuit 54 is improved.

4. CONFIGURATION OF DRIVE SIGNAL SELECTION CIRCUIT

Next, a configuration and an operation of the drive signal selection circuit 200 will be described. As described above, the drive signal selection circuit 200 generates a drive signal VOUT by selecting or not selecting a signal waveform of the drive signal COM, and outputs the drive signal VOUT to the first end of the piezoelectric element 60.

Figure 4:
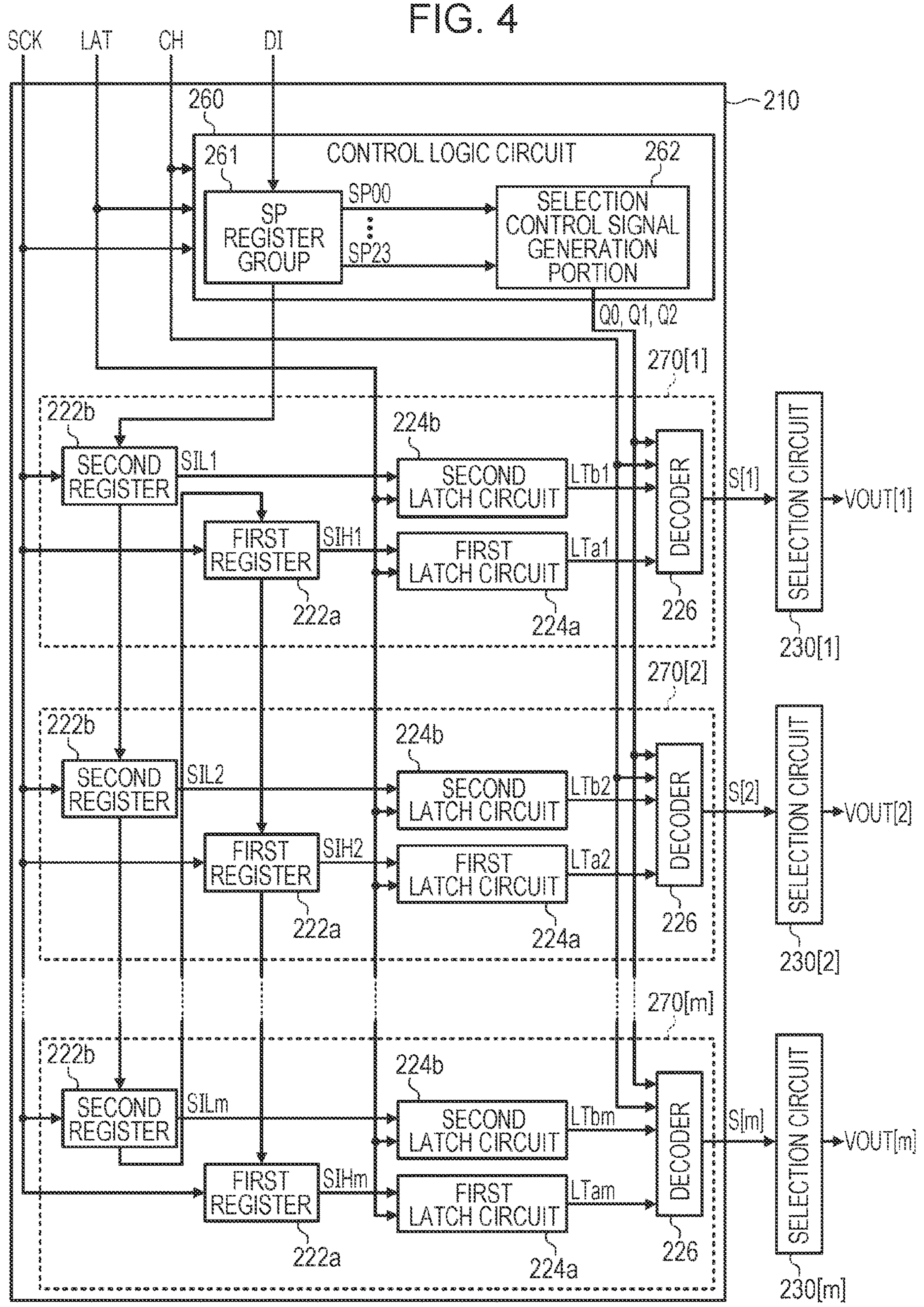
FIG. 4 is a diagram illustrating a configuration of a drive signal selection circuit.

FIG. 4 is a diagram illustrating a configuration of the drive signal selection circuit 200. As illustrated in FIG. 4, the drive signal selection circuit 200 includes a selection control circuit 210 and selection circuits 230[1] to 230[*m*] respectively corresponding to the piezoelectric elements 60[1] to 60[*m*].

The clock signal SCK, the latch signal LAT, the change signal CH, and the head control signal DI are input to the selection control circuit 210. The selection control circuit 210 generates selection signals S[1] to S[m] for switching whether to output the signal waveform included in the drive signal COM as the drive signal VOUT based on the input clock signal SCK, latch signal LAT, change signal CH, and head control signal DI. The selection signals S[1] to S[m] generated by the selection control circuit 210 are input to the corresponding selection circuits 230[1] to 230[*m*]. The selection circuits 230[1] to 230[*m*] select or do not select a signal waveform of the drive signal COM based on the input selection signals S[1] to S[m] to generate drive signals VOUT[1] to VOUT[m] corresponding to piezoelectric elements 60[1] to 60[*m*], and output the drive signals VOUT[1] to VOUT[m] to the corresponding piezoelectric elements 60[1] to 60[*m*]. Here, the selection circuits 230[1] to 230[*m*] all have the same configuration, and the selection circuits 230[1] to 230[*m*] corresponding to the piezoelectric element 60 among the piezoelectric elements 60[1] to 60[*m*] will be referred to as a selection circuit 230. In this case, the selection circuit 230 will be described as selecting or not selecting the signal waveform of the drive signal COM based on the selection signal S among the selection signals S[1] to S[m].

Figure 5:
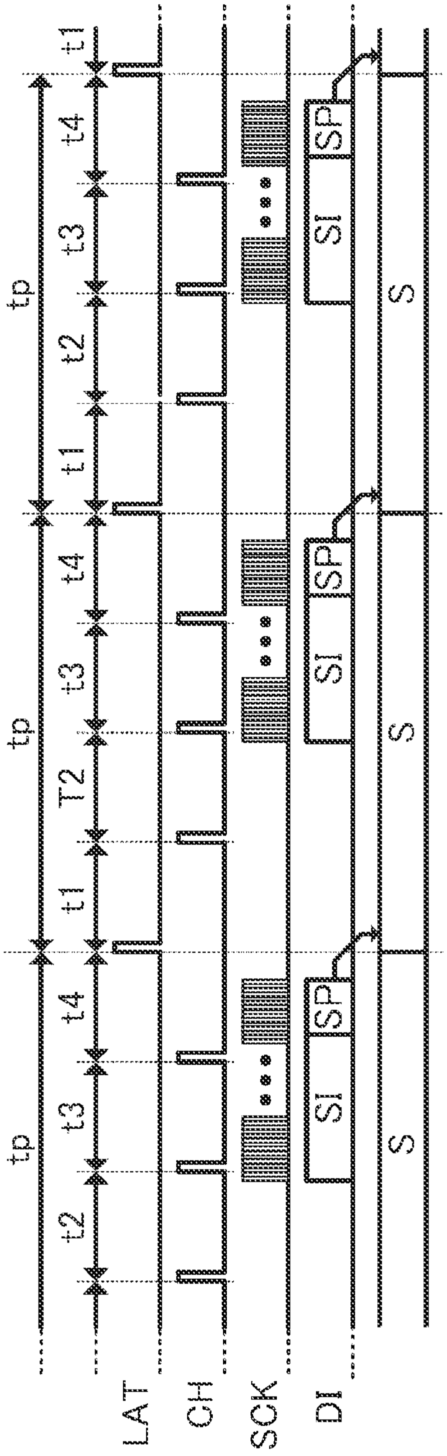
FIG. 5 is a diagram for describing a relationship between a latch signal LAT, a change signal CH, a clock signal SCK, a head control signal DI, and a selection signal S.

In describing the details of the operation of the selection control circuit 210, outlines of the latch signal LAT, the change signal CH, the clock signal SCK, and the head control signal DI input to the selection control circuit 210 will be described. FIG. 5 is a diagram for describing a relationship between the latch signal LAT, the change signal CH, the clock signal SCK, the head control signal DI, and the selection signal S.

The latch signal LAT is a pulse signal based on a signal output by the linear encoder 90 indicating a scanning position of the print head 20 and defines a cycle tp in which the print head 20 forms dots on the medium P. The change signal CH is a pulse signal that defines a switching timing of whether or not to supply the signal waveform included in the drive signal COM to the piezoelectric element 60, and divides the cycle tp into periods t1, t2, and t3. The drive signal selection circuit 200 selects or does not select a signal waveform included in the drive signal COM in each of the periods t1, t2, and t3 into which the cycle tp defined by the latch signal LAT is divided by the change signal CH, to generate the drive signal VOUT, and outputs the drive signal VOUT to the piezoelectric element 60.

The head control signal DI serially includes an ejection control signal SI and a waveform selection signal SP. The ejection control signal SI individually defines an ejection amount of the ink ejected by driving the piezoelectric element 60 for each of the piezoelectric elements 60[1] to 60[*m*]. The waveform selection signal SP defines a relationship between a logic level of the selection signal S output in each of the periods t1, t2, and t3 and the ejection control signal SI.

As illustrated in FIG. 5, the head control signal DI is input to the selection control circuit 210 in synchronization with the clock signal SCK in the cycle tp before the latch signal LAT rises. In this case, the head control signal DI input to the selection control circuit 210 is stored in a register corresponding to each of the piezoelectric elements 60[1] to 60[*m*]. The head control signal DI stored in the register is latched all at once at a rising edge of the latch signal LAT. That is, at the timing of the start of the cycle tp, the head control signal DI stored in the register is latched all at once. The selection control circuit 210 generates the selection signal S corresponding to each of the periods t1, t2, and t3 in the cycle tp after the latch signal LAT rises, based on the head control signal DI latched all at once, and outputs the selection signal S to the selection circuit 230.

Figure 6:
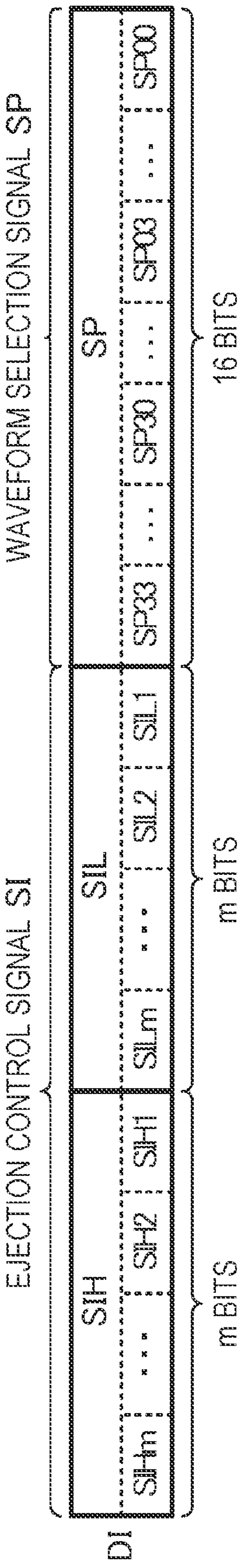
FIG. 6 is a diagram illustrating an example of a data configuration of the head control signal DI.

Here, details of the head control signal DI including the ejection control signal SI and the waveform selection signal SP will be described. FIG. 6 is a diagram illustrating an example of a data configuration of the head control signal DI. As illustrated in FIG. 6, the head control signal DI includes the ejection control signal SI and the waveform selection signal SP.

The ejection control signal SI is a signal that defines an ejection amount of the ink ejected by driving the piezoelectric element 60, and includes upper ejection data SIH and lower ejection data SIL. That is, the ejection control signal SI includes 2-bit data of the upper ejection data SIH and the lower ejection data SIL for controlling driving of the piezoelectric element 60 to correspond to each of the piezoelectric elements 60[1] to 60[*m*].

Specifically, the ejection control signal SI serially includes m-bit upper ejection data SIH corresponding to each of the piezoelectric elements 60[1] to 60[*m*] in an order of the upper ejection data SIH corresponding to the piezoelectric element 60[*m*], the upper ejection data SIH corresponding to the piezoelectric element 60[*m*−1], . . . , the upper ejection data SIH corresponding to the piezoelectric element 60[1], and serially includes, following the upper ejection data SIH, m-bit lower ejection data SIL corresponding to each of the piezoelectric elements 60[1] to 60[*m*] in an order of the lower ejection data SIL corresponding to the piezoelectric element 60[*m*], the lower ejection data SIL corresponding to the piezoelectric element 60[*m*−1], . . . , the lower ejection data SIL corresponding to the piezoelectric element 60[1]. That is, the ejection control signal SI is a 2 m-bit signal serially including m-bit upper ejection data SIH corresponding to the piezoelectric elements 60[*m*] to 60[1] and m-bit lower ejection data SIL corresponding to the piezoelectric elements 60[*m*] to 60[1]. The ejection amount of the ink ejected by driving the piezoelectric element 60[*i*], i being any one of 1 to m, is defined by 2 bits of the upper ejection data SIH corresponding to the piezoelectric element 60[*i*] and the piezoelectric element 60[*i*] corresponding to the lower ejection data SIL.

Here, in the following description, in some cases, the upper ejection data SIH corresponding to the piezoelectric element 60[*i*] will be referred to as upper ejection data SIHi, and the lower ejection data SIL corresponding to the piezoelectric element 60[*i*] will be referred to as lower ejection data SILi. Here, in the following description, in some cases, the upper ejection data SIH and the lower ejection data SIL corresponding to the piezoelectric element 60 will be collectively referred to as ejection data [SIH, SIL], and the upper ejection data SIHi and the lower ejection data SILi corresponding to the piezoelectric element 60[*i*] will be collectively referred to as ejection data [SIHi, SILi]. That is, the ejection amount of the ink ejected by driving the piezoelectric element 60[*i*] is defined by the ejection data [SIHi, SILi].

The waveform selection signal SP is a signal that defines a drive pattern of the piezoelectric element 60 corresponding to the ejection data [SIH, SIL] in each of the periods t1, t2, and t3, and defines a logic level of the selection signal S output in each of the periods t1, t2, and t3 corresponding to the ejection data [SIH, SIL]. The waveform selection signal SP in the present embodiment is a 12-bit signal including setting information SP03 to SP03, SP10 to SP13, and SP20 to SP23.

Specifically, the waveform selection signal SP serially includes the setting information SP03 to SP03 defining a drive pattern of the piezoelectric element 60 in the period t1 determined by the ejection data [SIH, SIL], the setting information SP10 to SP13 defining a drive pattern of the piezoelectric element 60 in the period t2 determined by the ejection data [SIH, SIL], and the setting information SP20 to SP23 defining a drive pattern of the piezoelectric element 60 in the period t3 determined by the ejection data [SIH, SIL] in an order of the setting information SP23, SP22, SP21, SP20, SP13, SP12, SP11, SP10, SP03, SP02, SP01, and SP03. The waveform selection signal SP is not limited to a 12-bit signal, but may be a signal of 12 bits or more or a signal of 12 bits or less according to the number of periods into which the cycle tp is divided by the change signal CH or the number of drive patterns of the piezoelectric element 60 defined by the ejection control signal SI.

Returning to FIG. 4, the selection control circuit 210 includes a control logic circuit 260 and selection signal output portions 270[1] to 270[*m*] provided to correspond to the piezoelectric elements 60[1] to 60[*m*]. The selection control circuit 210 generates the selection signals S[1] to S[*m*] respectively corresponding to the piezoelectric elements 60[1] to 60[*m*] and outputs the selection signals S[1] to S[*m*] to the selection circuits 230[1] to 230[*m*], based on the head control signal DI propagating in synchronization with the clock signal SCK at a timing defined by the input latch signal LAT and change signal CH.

The control logic circuit 260 includes an SP register group 261 and a selection control signal generation portion 262. The SP register group 261 includes a plurality of serially coupled registers, and configures a so-called shift register that causes the head control signal DI that is input in synchronization with the clock signal SCK to sequentially propagate to the subsequent registers. When the supply of the clock signal SCK is stopped, the SP register group 261 stores the setting information SP03 to SP23 included in the waveform selection signal SP of the head control signal DI.

The selection control signal generation portion 262 latches the setting information SP03 to SP23 stored in the SP register group 261 at the rising edge of the latch signal LAT. The selection control signal generation portion 262 generates selection control signals Q0, Q1, and Q2 by translating the latched setting information SP03 to SP23, and outputs the selection control signals Q0, Q1, and Q2 to a decoder 226 of each of the selection signal output portions 270[1] to 270[*m*]. The selection control signal Q0 includes the setting information SP03, SP01, SP02, and SP03, and defines a logic level of the selection signal S output from the selection control circuit 210 in the period t1. The selection control signal Q1 includes the setting information SP10, SP11, SP12, and SP13, and defines a logic level of the selection signal S output from the selection control circuit 210 in the period t2. The selection control signal Q2 includes the setting information SP20, SP21, SP22, and SP23, and defines a logic level of the selection signal S output from the selection control circuit 210 in the period t3. Here, in the following description, in some cases, the selection control signal Q0 including the setting information SP03, SP01, SP02, and SP03 will be referred to as a selection control signal Q0[SP03, SP01, SP02, SP03], the selection control signal Q1 including the setting information SP10, SP11, SP12, and SP13 will be referred to as a selection control signal Q1[SP10, SP11, SP12, SP13], and the selection control signal Q2 including the setting information SP20, SP21, SP22, and SP23 will be referred to as a selection control signal Q2[SP20, SP21, SP22, SP23].

Each of the selection signal output portions 270[1] to 270[*m*] has a first register 222*a*, a second register 222*b*, a first latch circuit 224*a*, a second latch circuit 224*b*, and a decoder 226.

The second register 222*b* included in each of the selection signal output portions 270[1] to 270[*m*] is serially coupled to the subsequent stage of the SP register group 261 including a plurality of registers, and the first register 222*a* included in each of the selection signal output portions 270[1] to 270[*m*] is serially coupled to the subsequent stage of the m second registers 222*b* coupled serially.

Specifically, the second register 222*b* included in the selection signal output portion 270[1] is coupled to the subsequent stage of the SP register group 261, and the second register 222*b* included in the selection signal output portion 270[2], the second register 222*b* included in the selection signal output portion 270[3], . . . , and the second register 222*b* included in the selection signal output portion 270[*m*] are coupled serially in order to the subsequent stage of the second register 222*b* included in the selection signal output portion 270[1]. The first register 222*a* included in the selection signal output portion 270[1] is coupled to the subsequent stage of the second register 222*b* included in the selection signal output portion 270[*m*]. The first register 222*a* included in the selection signal output portion 270[2], the first register 222*a* included in the selection signal output portion 270[3], . . . , and the first registers 222*a* included in the selection signal output portion 270[*m*] are coupled serially in order to the subsequent stage of the first register 222*a* included in the selection signal output portion 270[1].

In other words, the SP register group 261, the m second registers 222*b* respectively included in the selection signal output portions 270[1] to 270[*m*], and the m first registers 222*a* respectively included in the selection signal output portions 270[1] to 270[*m*] configure a shift register. The head control signal DI input to the SP register group 261 propagates to the subsequent stage in the order of the m second registers 222*b* respectively included in the selection signal output portions 270[1] to 270[*m*] and the m first registers 222*a* respectively included in the selection signal output portions 270[1] to 270[*m*] in synchronization with the clock signal SCK. Thereafter, when the supply of the clock signal SCK is stopped, the lower ejection data SILi corresponding to the piezoelectric element 60[*i*] is stored in the second register 222*b* included in the selection signal output portion 270[*i*], and the upper ejection data SIHi corresponding to the piezoelectric element 60[*i*] is stored in the first register 222*a* included in the selection signal output portion 270[*i*].

The upper ejection data SIH stored in the first register 222*a* included in each of the selection signal output portions 270[1] to 270[*m*] is latched by the corresponding first latch circuit 224*a* at the rising edge of the latch signal LAT, and the lower ejection data SIL stored in the second register 222*b* included in each of the selection signal output portions 270[1] to 270[*m*] is latched by the corresponding second latch circuit 224*b* at the rising edge of the latch signal LAT. The first latch circuit 224*a* outputs the latched upper ejection data SIH to the decoder 226 as latch data LTa, and the second latch circuit 224*b* outputs the latched lower ejection data SIL to the decoder 226 as latch data LTb.

Here, in the following description, in some cases, the latch data LTa output by the first latch circuit 224*a* included in the selection signal output portion 270[*i*] will be referred to as latch data LTai, and the latch data LTb output by the second latch circuit 224*b* included in the selection signal output portion 270[*i*] will be referred to as latch data LTbi. In some cases, the latch data LTa and LTb will be collectively referred to as latch data [LTa, LTb], and the latch data LTai and LTbi corresponding to the selection signal output portion 270[*i*] will be collectively referred to as latch data [LTai, LTbi].

The selection control signal Q0[SP03, SP01, SP02, SP03], the selection control signal Q1[SP10, SP11, SP12, SP13], and the selection control signal Q2[SP20, SP21, SP22, SP23] output by the selection control signal generation portion 262 are input in common to the decoder 226 included in each of the selection signal output portions 270[1] to 270[*m*], and the latch data [LTa, LTb] output by the corresponding first latch circuit 224*a* and second latch circuit 224*b* are input thereto. That is, the selection control signal Q0[SP03, SP01, SP02, SP03], the selection control signal Q1[SP10, SP11, SP12, SP13], and the selection control signal Q2[SP20, SP21, SP22, SP23] output by the selection control signal generation portion 262, and the latch data [LTai, LTbi] corresponding to the ejection data [SIHi, SILi] are input to the decoder 226 included in the selection signal output portion 270[*i*]. The decoder 226 included in the selection signal output portion 270[*i*] generates the selection signal S[*i*] by decoding the latch data [LTai, LTbi] based on the selection control signals Q0, Q1, and Q2, and outputs the selection signal S[*i*] to the selection circuit 230[*i*].

Figures 7, 8:
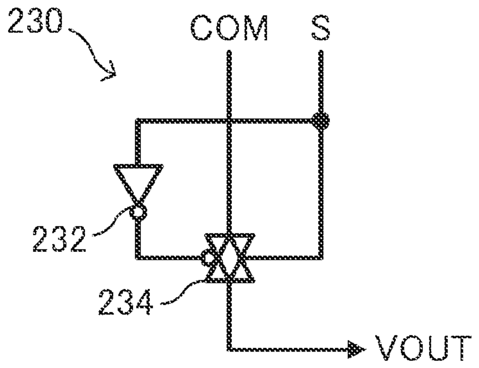
FIG. 7 is a diagram illustrating decoding contents of a decoder.
FIG. 8 is a diagram illustrating a configuration of a selection circuit corresponding to a piezoelectric element.

FIG. 7 is a diagram illustrating decoding contents of the decoder 226 based on the selection control signals Q0, Q1, and Q2. As illustrated in FIG. 7, the decoder 226 outputs the selection signal S with a logic level defined by the selection control signal Q0[SP03, SP01, SP02, SP03] in the period t1, outputs the selection signal S with a logic level defined by the selection control signal Q1[SP10, SP11, SP12, SP13] in the period t2, and outputs the selection signal S with a logic level defined by the selection control signal Q2[SP20, SP21, SP22, SP23] in the period t3.

Specifically, when the latch data [LTa, LTb]=[1, 1] is input to the decoder 226, the decoder 226 outputs a logic level of the setting information SP03 as the selection signal S in the period t1, outputs a logic level of the setting information SP10 as the selection signal S in the period t2, and outputs a logic level of the setting information SP20 as the selection signal S in the period t3, according to the contents defined by the selection control signals Q0, Q1, and Q2. Similarly, when the latch data [LTa, LTb]=[1, 0] is input to the decoder 226, the decoder 226 outputs a logic level of the setting information SPOT as the selection signal S in the period t1, outputs a logic level of the setting information SP11 as the selection signal S in the period t2, and outputs a logic level of the setting information SP21 as the selection signal S in the period t3, according to the contents defined by the selection control signals Q0, Q1, and Q2. Similarly, when the latch data [LTa, LTb]=[0, 1] is input to the decoder 226, the decoder 226 outputs a logic level of the setting information SP02 as the selection signal S in the period t1, outputs a logic level of the setting information SP12 as the selection signal S in the period t2, and outputs a logic level of the setting information SP22 as the selection signal S in the period t3, according to the contents defined by the selection control signals Q0, Q1, and Q2. Similarly, when the latch data [LTa, LTb]=[0, 0] is input to the decoder 226, the decoder 226 outputs a logic level of the setting information SP03 as the selection signal S in the period t1, outputs a logic level of the setting information SP13 as the selection signal S in the period t2, and outputs a logic level of the setting information SP23 as the selection signal S in the period t3, according to the contents defined by the selection control signals Q0, Q1, and Q2.

As described above, the selection control circuit 210 outputs the selection signals S[1] to S[*m*] for controlling the states of the selection circuits 230[1] to 230[*m*] respectively corresponding to the piezoelectric elements 60[1] to 60[*m*] based on the clock signal SCK, the latch signal LAT, the change signal CH, and the head control signal DI.

Next, configurations of the selection circuits 230[1] to 230[*m*] will be described. Here, the selection circuits 230[1] to 230[*m*] all have the same configuration. Therefore, when it is not necessary to distinguish the selection circuits 230[1] to 230[*m*], the selection circuits may be simply referred to as a selection circuit 230. A description will be made assuming that the selection signal S among the selection signals S[1] to S[*m*] is input to the selection circuit 230.

FIG. 8 is a diagram illustrating a configuration of the selection circuit 230 corresponding to the piezoelectric element 60. As illustrated in FIG. 8, the selection circuit 230 has an inverter 232 that is a NOT circuit, and a transfer gate 234.

While the selection signal S output by the selection control circuit 210 is input to a positive control end that is not marked with a circle at the transfer gate 234, the selection signal S is logically inverted by the inverter 232 and is also input to a negative control end that is marked with a circle at the transfer gate 234. The drive signal COM is supplied to an input end of the transfer gate 234. Specifically, the transfer gate 234 conducts the input end and the output end to each other when the input selection signal S has an H level, and does not conduct the input end and the output end to each other when the input selection signal S has an L level. The drive signal VOUT is output from the output end of the transfer gate 234.

As described above, the drive signal selection circuit 200 according to the present embodiment selects or does not select a signal waveform of the drive signal COM based on the input clock signal SCK, latch signal LAT, change signal CH, and head control signal DI to generate the drive signals VOUT[1] to VOUT[*m*] respectively corresponding to the piezoelectric elements 60[1] to 60[*m*], and outputs the drive signals VOUT[1] to VOUT[*m*] to the corresponding piezoelectric elements 60[1] to 60[*m*].

Here, an example of a specific operation of the drive signal selection circuit 200 will be described. As described above, the drive signal selection circuit 200 generates the drive signal VOUT by selecting or not selecting a signal waveform of the drive signal COM, and outputs the drive signal VOUT to the first end of the piezoelectric element 60. Thus, in describing an example of the specific operation of the drive signal selection circuit 200, a specific example of the signal waveform of the drive signal COM input to the drive signal selection circuit 200 will be described.

Figure 9:
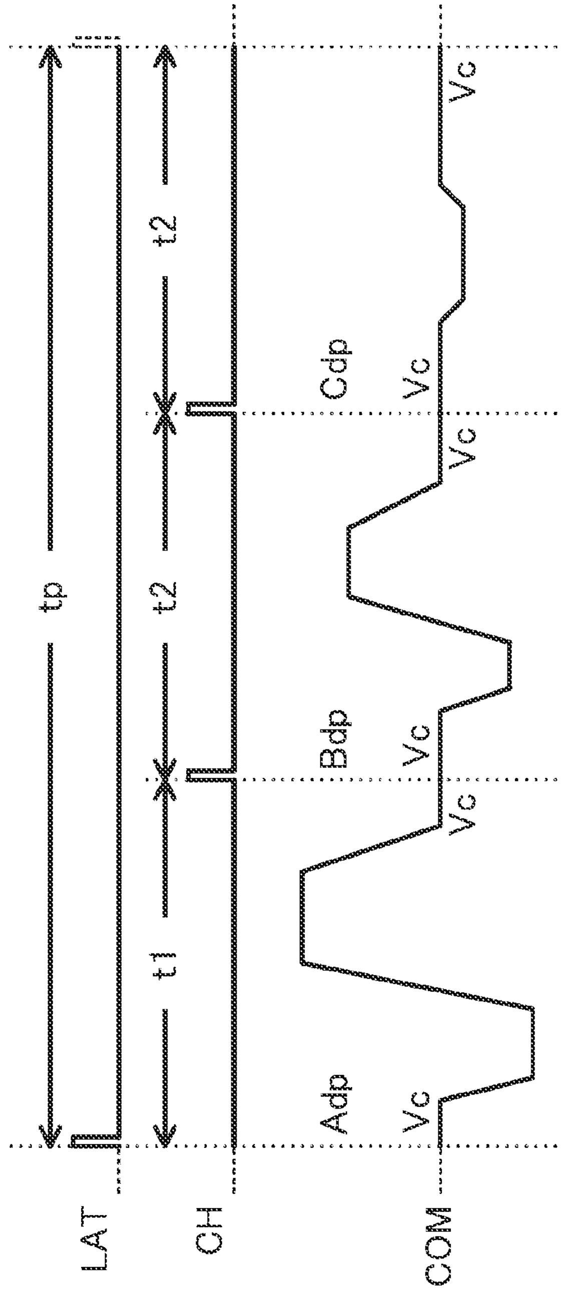
FIG. 9 is a drawing illustrating an example of a signal waveform of a drive signal COM.

FIG. 9 is a graph illustrating an example of the signal waveform of the drive signal COM. As illustrated in FIG. 9, the drive signal COM is a signal including a signal waveform in which a trapezoidal waveform Adp disposed in the period t1 after the latch signal LAT rises until the change signal CH rises, a trapezoidal waveform Bdp disposed in the period t2 after the change signal CH rises until the next change signal CH rises, and a trapezoidal waveform Cdp disposed in the period t3 after the change signal CH rises until the latch signal LAT rises are continuous.

The trapezoidal waveform Adp is a signal waveform for driving the piezoelectric element 60 to eject a predetermined amount of ink from a corresponding nozzle when supplied to the piezoelectric element 60, the trapezoidal waveform Bdp is a signal waveform for driving the piezoelectric element 60 to eject an amount of ink smaller than the predetermined amount of ink from a corresponding nozzle when supplied to the piezoelectric element 60, and the trapezoidal waveform Cdp is a signal waveform for driving the piezoelectric element 60 not to eject ink a corresponding nozzle even when supplied to the piezoelectric element 60. The trapezoidal waveform Cdp is a signal waveform for vibrating the ink in the vicinity of the nozzle opening portion of the nozzle to prevent an increase in ink viscosity. In the following description, when the trapezoidal waveform Cdp is supplied to the piezoelectric element 60, an operation of vibrating the ink in the vicinity of the opening portion of the nozzle may be referred to as micro-vibration. In the following description, an amount of ink ejected when the trapezoidal waveform Adp is supplied to the piezoelectric element 60 may be referred to as a large amount, and an amount of ink ejected when the trapezoidal waveform Bdp is supplied to the piezoelectric element 60 may be referred to as a small amount.

Voltage values of the trapezoidal waveforms Adp, Bdp, and Cdp at the start timings and end timings of the trapezoidal waveforms Adp, Bdp, and Cdp are all common to a voltage Vc. In other words, each of the trapezoidal waveforms Adp, Bdp, and Cdp starts at the voltage Vc and ends at the voltage Vc. The cycle tp including the periods t1, t2, and t3 corresponds to a dot formation cycle for forming new dots on the medium P.

Figure 10:
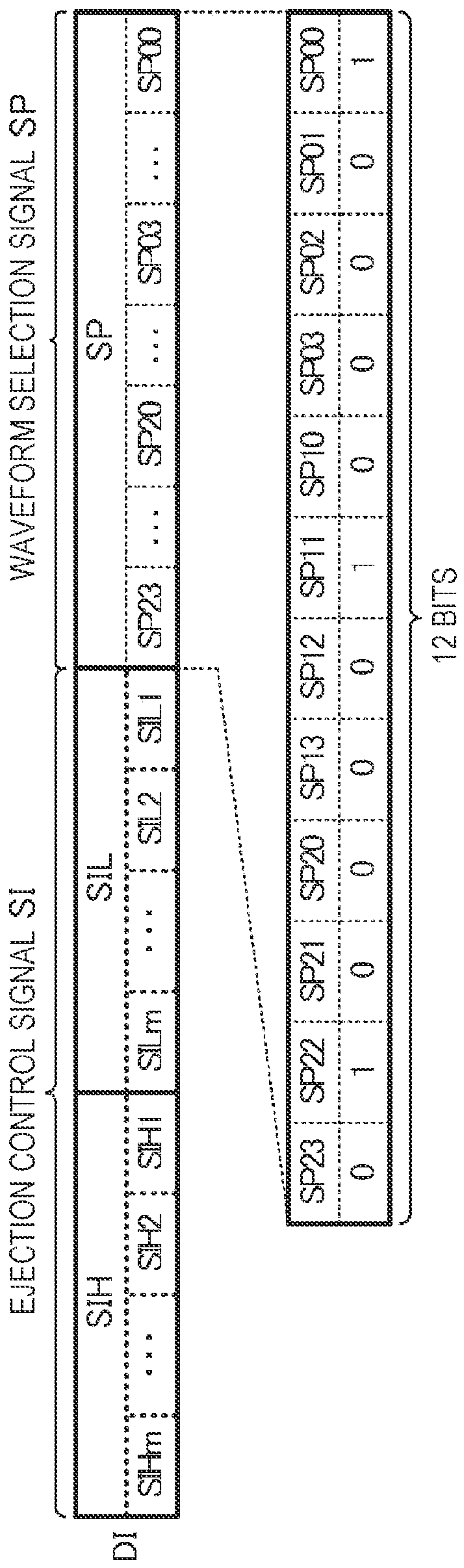
FIG. 10 is a diagram illustrating an example of the head control signal DI.

FIG. 10 is a diagram illustrating an example of the head control signal DI input to the drive signal selection circuit 200. Here, the ejection control signal SI included in the head control signal DI defines an ejection amount of the ink ejected by driving the piezoelectric element 60. Therefore, a logic level of the ejection control signal SI appropriately changes during a printing period in which the liquid ejection apparatus 1 ejects the ink and forms a desired image on the medium P. That is, the logic level of the ejection data [SIH, SIL] included in the ejection control signal SI changes to either 0 or 1 according to an amount of the ejected ink. In other words, the logic level of the ejection data [SIH, SIL] included in the ejection control signal SI changes for each cycle tp according to an image formed on the medium P. Therefore, in FIG. 10, only a specific logic level for the waveform selection signal SP is illustrated, and a specific logic level for the ejection control signal SI is not illustrated.

As illustrated in FIG. 10, the head control signal DI including the waveform selection signal SP in which the setting information SP03, SP01, SP02, SP03, SP10, SP11, SP12, SP13, SP20, SP21, SP22, and SP23 are respectively "1", "0", "0", "0", "0", "1", "0", "0", "0", "0", "1", and "0" is input to the drive signal selection circuit 200. Therefore, based on the waveform selection signal SP, the selection control signal Q0[SP03, SP01, SP02, SP03]=[1, 0, 0, 0], the selection control signal Q1[SP10, SP11, SP12, SP13]=[0, 1, 0, 0], and the selection control signal Q2[SP20, SP21, SP22, SP23]=[0, 0, 1, 0] are generated by the selection control signal generation portion 262 included in the control logic circuit 260 and output to the decoder 226.

FIG. 11 is a diagram illustrating a specific example of the decoding contents of the decoder 226 when the head control signal DI including the waveform selection signal SP described above is input to the drive signal selection circuit 200. A description will be made assuming that the decoder 226 of the present embodiment outputs the selection signal S with an H level when logic levels of the corresponding setting information SP23 to SP20, SP13 to SP10, and SP03 to SP03 are "1", and outputs the selection signal S with an L level when logic levels of the corresponding setting information SP23 to SP20, SP13 to SP10, and SP03 to SP03 are "0".

As illustrated in FIG. 11, when the latch data [LTa, LTb]=[1, 1] corresponding to the ejection data [SIH, SIL]=[1, 1] is input to the decoder 226, the decoder 226 outputs the selection signal S with H, L, and L levels in the periods t1, t2, and t3. When the latch data [LTa, LTb]=[1, 0] corresponding to the ejection data [SIH, SIL]=[1, 0] is input to the decoder 226, the decoder 226 outputs the selection signal S with L, H, and L levels in the periods t1, t2, and t3. When the latch data [LTa, LTb]=[0, 1] corresponding to the ejection data [SIH, SIL]=[0, 1] is input to the decoder 226, the decoder 226 outputs the selection signal S with L, L, and H levels in the periods t1, t2, and t3. When the latch data [LTa, LTb]=[0, 0] corresponding to the ejection data [SIH, SIL]=[0, 1] is input to the decoder 226, the decoder 226 outputs the selection signal S with L, L, and L levels in the periods t1, t2, and t3.

Figure 12:
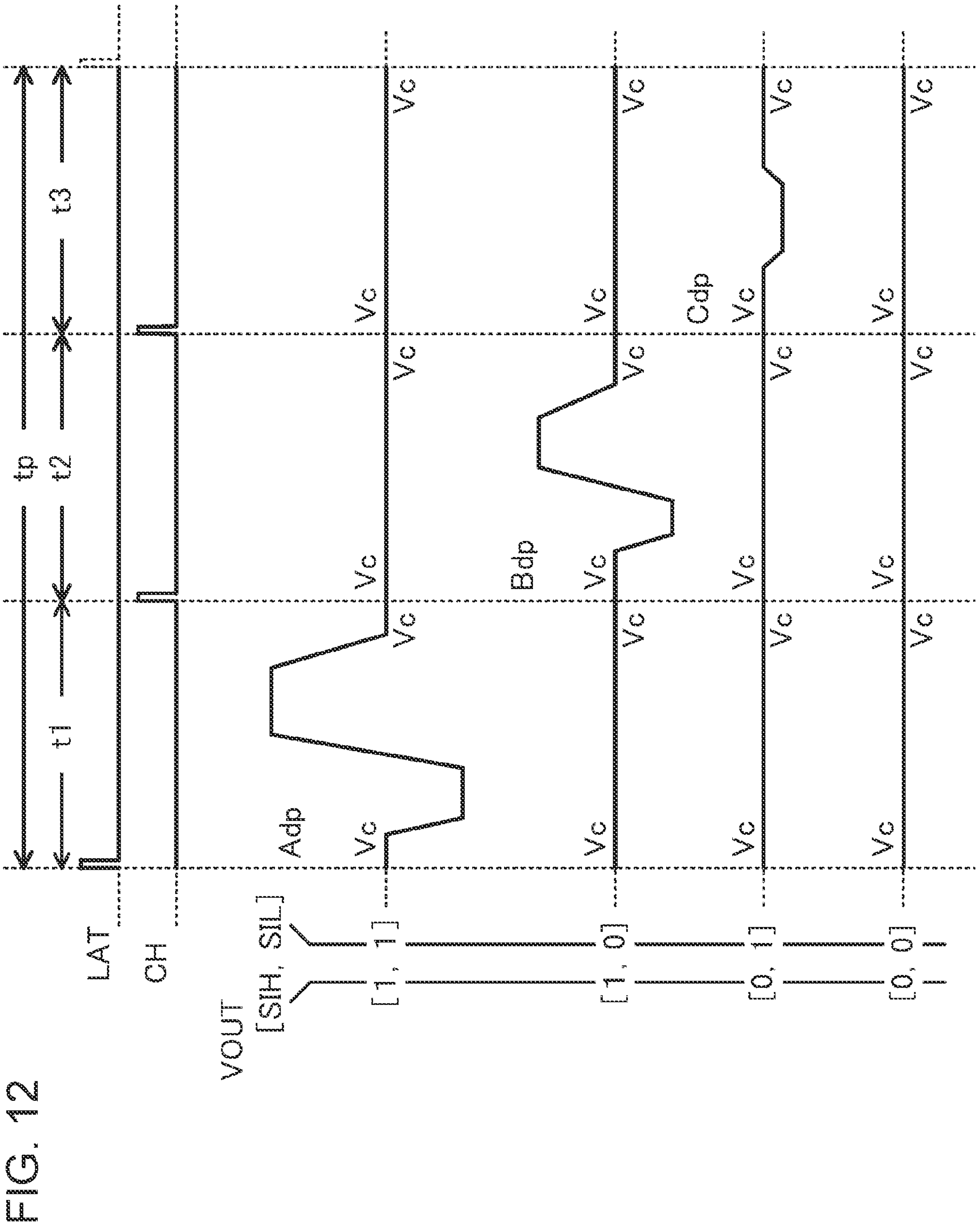
FIG. 12 is a diagram illustrating an example of the drive signal VOUT output from the selection circuit when a selection signal S illustrated in FIG. 11 is supplied.

FIG. 12 is a diagram illustrating an example of the drive signal VOUT output from the selection circuit 230 when the selection signal S illustrated in FIG. 11 is supplied.

As illustrated in FIG. 12, when the latch data [LTa, LTb]=[1, 1] is input to the decoder 226, the logic level of the selection signal S is set to an H level in the period t1, an L level in the period t2, and an L level in the period t3. Therefore, the input end and the output end of the selection circuit 230 are set to be conductive in the period t1, non-conductive in the period t2, and non-conductive in the period t3. As a result, the selection circuit 230 outputs the drive signal VOUT that has the trapezoidal waveform Adp in the period t1, has the constant voltage Vc in the period t2, and has the constant voltage Vc in the period t3.

In this case, by driving the piezoelectric element 60, a large amount of ink is ejected in the period t1, ink is not ejected in the period t2, and ink is not ejected in the period t3. Therefore, a large amount of ink lands on the medium P, and a large dot is formed on the medium P.

When the latch data [LTa, LTb]=[1, 0] is input to the decoder 226, the logic level of the selection signal S is set to an L level in the period t1, an H level in the period t2, and an L level in the period t3. Therefore, the input end and the output end of the selection circuit 230 are set to be non-conductive in the period t1, conductive in the period t2, and non-conductive in the period t3. As a result, the selection circuit 230 outputs the drive signal VOUT that has the constant voltage Vc in the period t1, has the trapezoidal waveform Bdp in the period t2, and has the constant voltage Vc in the period t3.

In this case, by driving the piezoelectric element 60, the ink is not ejected in the period t1, a small amount of ink is ejected in the period t2, and the ink is not ejected in the period t3. Therefore, a small amount of ink lands on the medium P, and a small dot is formed on the medium P.

When the latch data [LTa, LTb]=[0, 1] is input to the decoder 226, the logic level of the selection signal S is set to an L level in the period t1, an L level in the period t2, and an H level in the period t3. Therefore, the input end and the output end of the selection circuit 230 are set to be non-conductive in the period t1, non-conductive in the period t2, and conductive in the period t3. As a result, the selection circuit 230 outputs the drive signal VOUT that has the constant voltage Vc in the period t1, has the constant voltage Vc in the period t2, and has the trapezoidal waveform Cdp in the period t3.

In this case, by driving the piezoelectric element 60, the ink is not ejected in the period t1, the ink is not ejected in the period t2, and the ink is not ejected in the period t3. Therefore, the ink does not land on the medium P, dots are not formed on the medium P, and micro-vibration is executed.

When the latch data [LTa, LTb]=[0, 0] is input to the decoder 226, the logic level of the selection signal S is set to an L level in the period t1, an L level in the period t2, and an L level in the period t3. Therefore, the input end and the output end of the selection circuit 230 are set to be non-conductive in the period t1, non-conductive in the period t2, and non-conductive in the period t3. As a result, the selection circuit 230 outputs the drive signal VOUT that has the constant voltage Vc in the period t1, has the constant voltage Vc in the period t2, and has the constant voltage Vc in the period t3. In this case, by driving the piezoelectric element 60, the ink is not ejected in the period t1, the ink is not ejected in the period t2, and the ink is not ejected in the period t3. Therefore, the ink does not land on the medium P, and dots are not formed on the medium P. In this case, micro-vibration is not performed on the ink in the vicinity of the opening portion of the nozzle corresponding to the piezoelectric element 60.

As described above, the ejection module 22 of the present embodiment includes the plurality of piezoelectric elements 60, and the drive signal selection circuit 200 includes a plurality of selection circuits 230 that switch whether or not to supply the drive signal VOUT based on the drive signal COM to the plurality of piezoelectric elements 60 included in the ejection module 22. The drive signal selection circuit 200 outputs the drive signal VOUT for forming a large dot on the medium P by controlling the selection circuit 230 to be conductive in the period t1 and non-conductive in the periods t2 and t3 during the cycle tp, outputs the drive signal VOUT for forming a small dot on the medium P by controlling the selection circuit 230 to be non-conductive in the period t2 and non-conductive in the periods t1 and t2 during the cycle tp, outputs the drive signal VOUT for not forming a dot on the medium P and executing micro-vibration by controlling the selection circuit 230 to be conductive in the period t3 and non-conductive in the periods t1 and t2 during the cycle tp, and outputs the drive signal VOUT for not forming a dot on the medium P and not executing micro-vibration by controlling the selection circuit 230 to be non-conductive in all the periods t1 to t3 during the cycle tp.

Here, in the drive signal VOUT output by the drive signal selection circuit 200, a signal waveform in which one of the trapezoidal waveforms Adp, Bdp, and Cdp included in the drive signal COM is selected and a signal waveform that is constant at the voltage Vc stored in a capacitive component of the piezoelectric element 60 to which the drive signal VOUT is supplied are continuous. That is, the drive signal VOUT output by the drive signal selection circuit 200 is synonymous with the drive signal VOUT supplied to the piezoelectric element 60.

5. STRUCTURE OF EJECTION MODULE 22 INCLUDED IN PRINT HEAD 20

Figure 13:
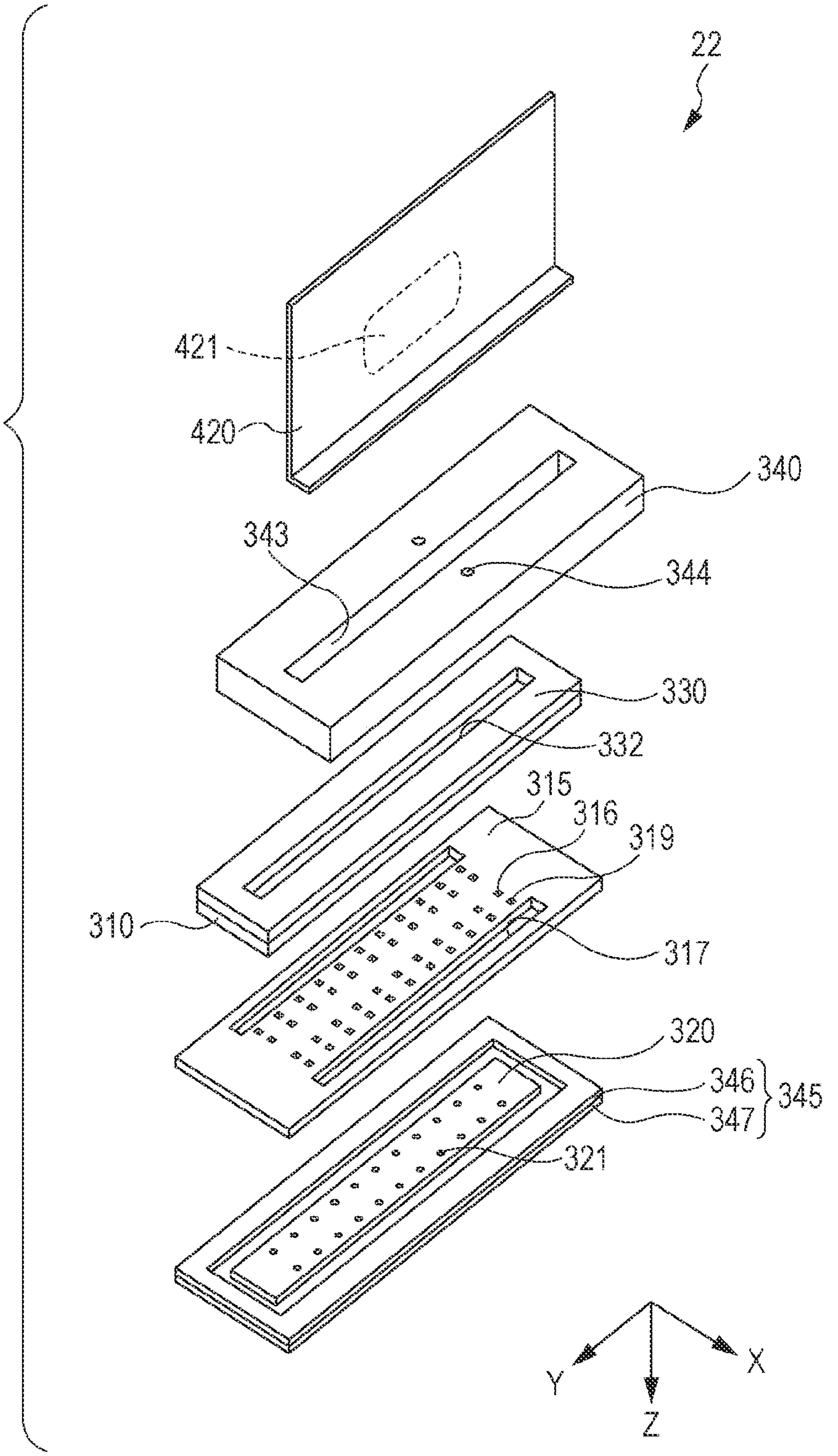
FIG. 13 is an exploded perspective view illustrating a structure of an ejection module.
Figure 14:
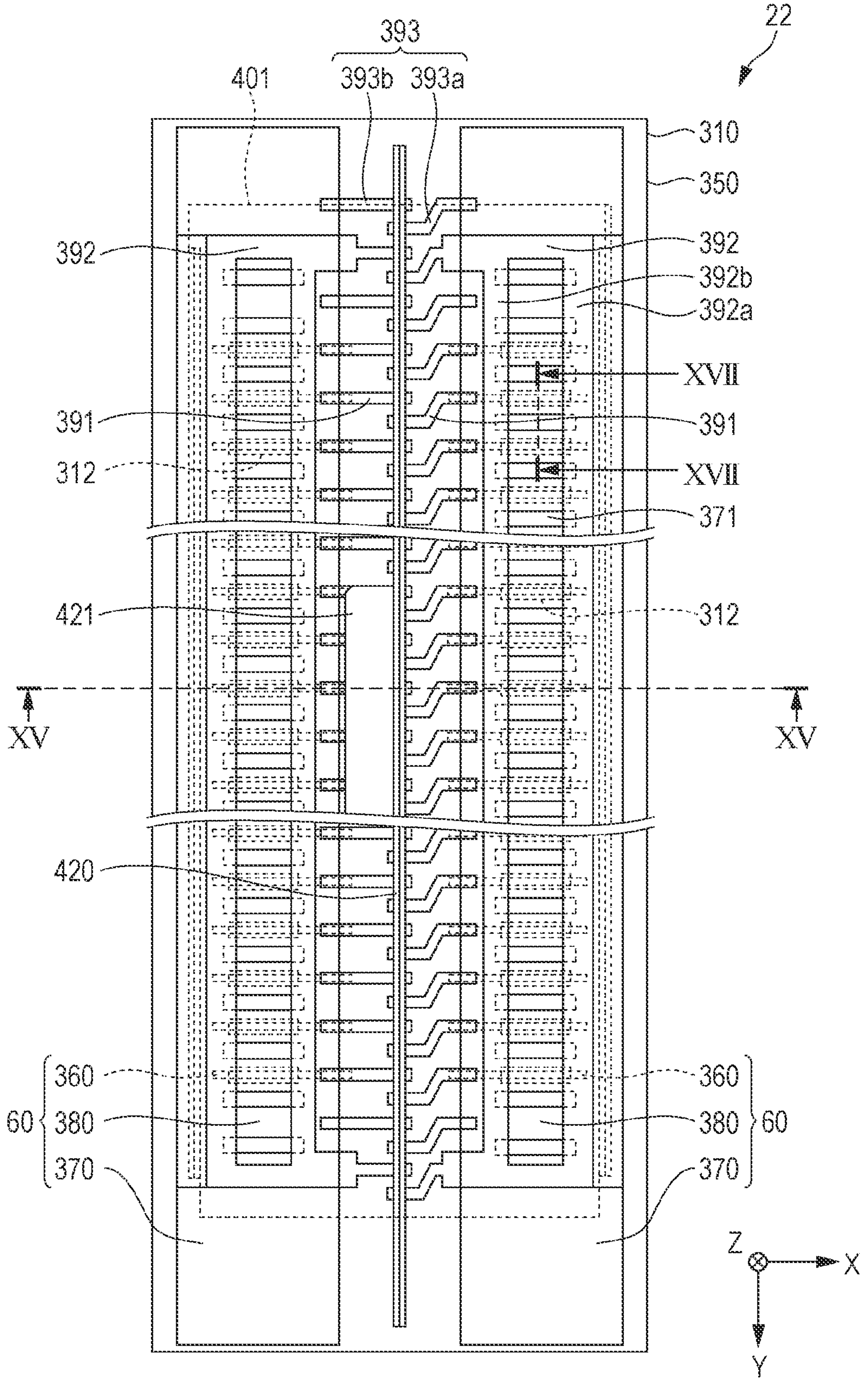
FIG. 14 is a plan view of the ejection module.
Figure 15:
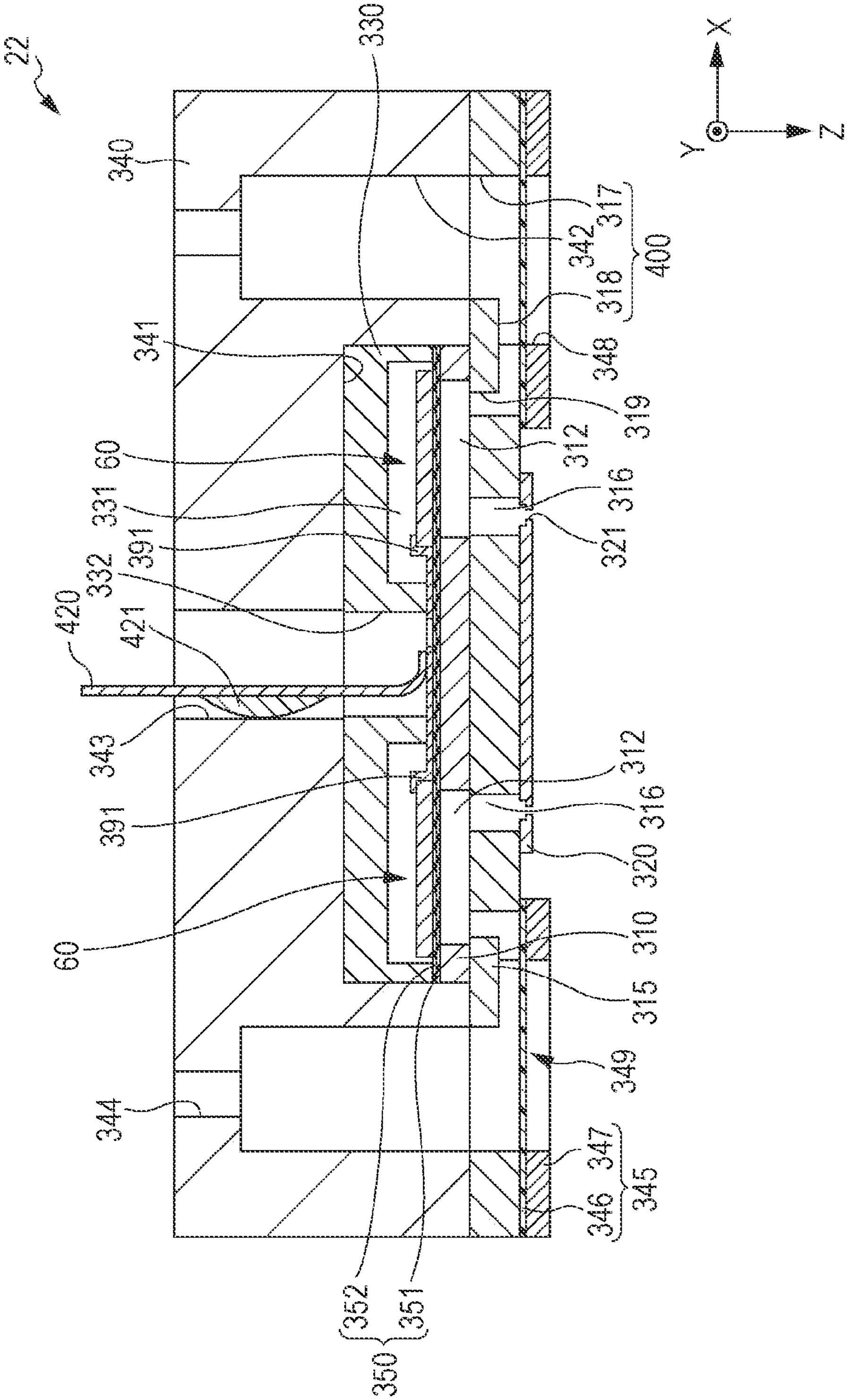
FIG. 15 is a sectional view taken along the line XV-XV in FIG. 14.
Figure 16:
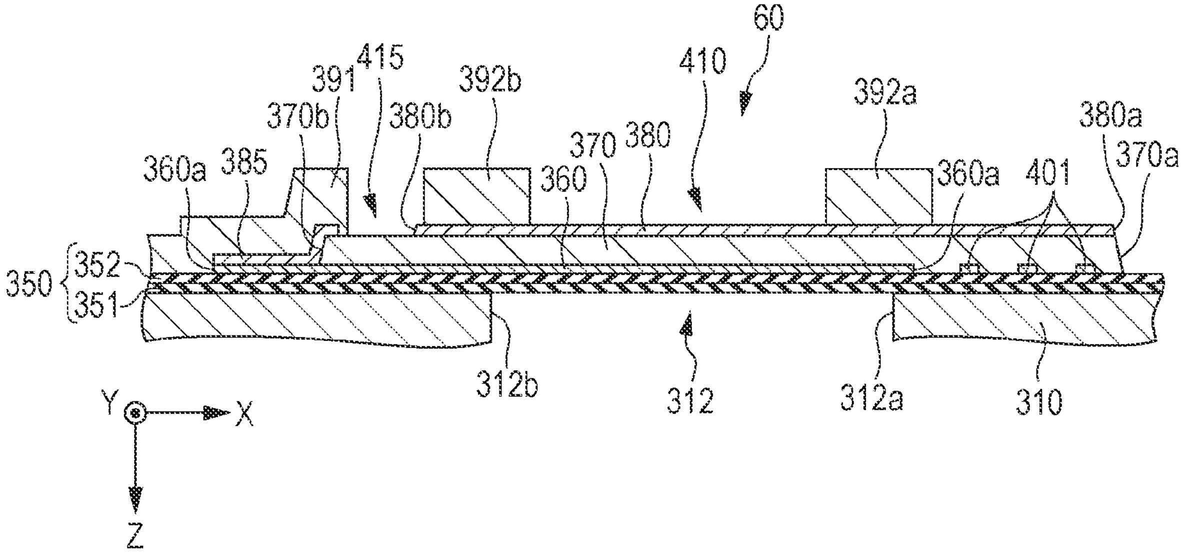
FIG. 16 is a detailed view of a main portion of a configuration in FIG. 15.
Figure 17:
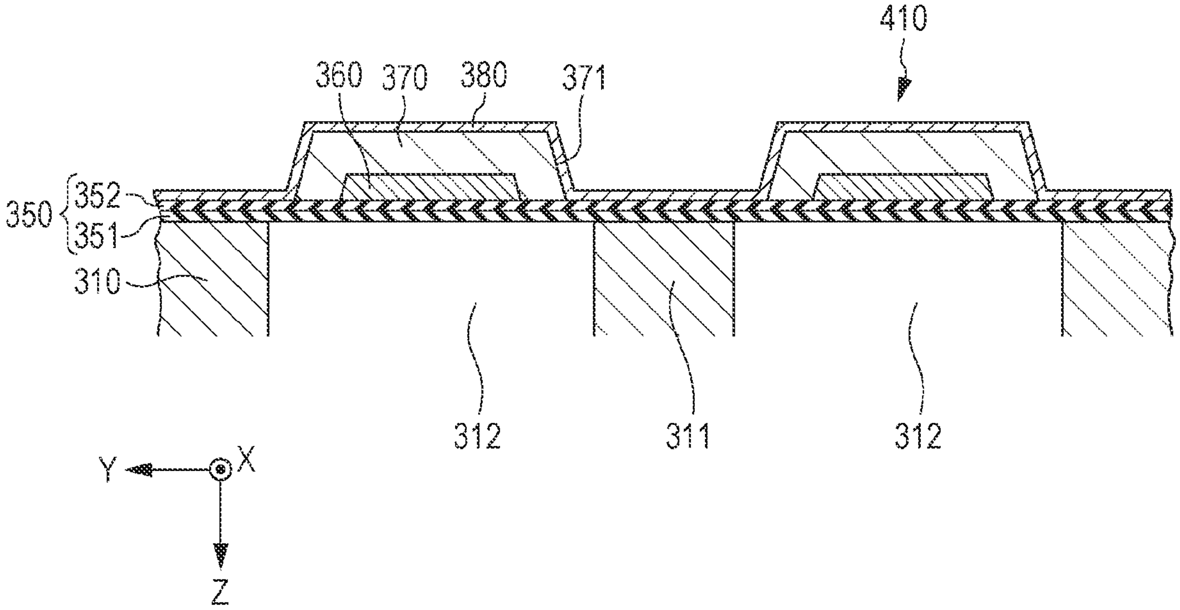
FIG. 17 is a sectional view taken along the line XVII-XVII in FIG. 14.

Next, a structure of the ejection module 22 included in the print head 20 will be described. FIG. 13 is an exploded perspective view illustrating the structure of the ejection module 22, FIG. 14 is a plan view of the ejection module 22, and FIG. 15 is a sectional view taken along the line XV-XV in FIG. 14, FIG. 16 is a detailed view of a main portion IN FIG. 15, and FIG. 17 is a sectional view taken along the line XVII-XVII in FIG. 14. In describing the structure of the print head 20, X, Y, and Z are illustrated in respective three spatial axes orthogonal to each other. In the present embodiment, directions along these axes are referred to as an X-axis direction, a Y-axis direction, and a Z-axis direction, and when the directions are specified, the positive direction is indicated by "+" and the negative direction is indicated by "−". Positive and negative signs are used together with the direction notations, a direction in which an arrow in each drawing is directed will be described as the + direction, and an opposite direction of the arrow will be described as the − direction. The Z-axis direction indicates a vertical direction, the + Z direction indicates a vertical downward direction, and the − Z direction indicates a vertical upward direction. The three X, Y, and Z spatial axes that do not limit the positive direction and the negative direction will be described as the X axis, the Y axis, and the Z axis.

As illustrated in FIG. 13, the ejection module 22 ejects ink in the Z-axis direction, more specifically, in the +Z-axis direction. The ejection module 22 includes a pressure chamber substrate 310, a communication plate 315, a nozzle plate 320, a compliance substrate 345, a vibration plate 350 that will be described later, a piezoelectric element 60 that will be described later, a protective substrate 330, a case member 340, and a wiring substrate 420 as constituent members.

The pressure chamber substrate 310 is formed of, for example, a silicon substrate, a glass substrate, an SOI substrate, various ceramic substrates, or the like. As illustrated in FIG. 14, on the pressure chamber substrate 310, two rows of pressure chambers in which a plurality of pressure chambers 312 are arranged in the Y-axis direction are disposed in the X-axis direction. In other words, the ejection module 22 included in the print head 20 has a plurality of pressure chambers 312, and the plurality of pressure chambers 312 form a pressure chamber row in which the plurality of pressure chambers 312 are arranged in the Y-axis direction. Here, out of the two pressure chamber rows, the pressure chamber row on the +X direction side may be referred to as a first pressure chamber row, and the pressure chamber row separated from the first pressure chamber row in the −X direction in the X-axis direction may be referred to as a second pressure chamber row. Although FIG. 14 is a plan view of the ejection module 22, a configuration around the pressure chamber substrate 310 is illustrated, and the protective substrate 330 and the case member 340 are not illustrated.

The plurality of pressure chambers 312 configuring each pressure chamber row are disposed on a straight line in the Y-axis direction such that positions thereof in the X-axis direction are the same position. The pressure chambers 312 adjacent to each other in the Y-axis direction are partitioned by a partition wall 311 illustrated in FIG. 17. Of course, the disposition of the pressure chamber 312 is not particularly limited. For example, the disposition of the plurality of pressure chambers 312 arranged in the Y-axis direction may be a so-called staggered disposition in which the respective pressure chambers 312 are disposed at positions shifted in the X-axis direction for every other pressure chamber 312.

The pressure chamber 312 of the present embodiment is formed in a rectangular shape, for example, in which a length in the X-axis direction is longer than a length in the Y-axis direction in a plan view from the +Z direction. Of course, a shape of the pressure chamber 312 in a plan view from the +Z direction is not particularly limited, and may be a parallel quadrilateral shape, a polygonal shape, a circular shape, an oval shape, or the like. The oval shape referred to here is a shape in which both end portions in a longitudinal direction are semicircular based on a rectangular shape, and includes a rounded rectangular shape, an elliptical shape, an egg shape, and the like.

As illustrated in FIGS. 13 and 16, the communication plate 315, the nozzle plate 320, and the compliance substrate 345 are stacked in order on the +Z direction side of the pressure chamber substrate 310.

The communication plate 315 is provided with a nozzle communication path 316 via which the pressure chamber 312 and the nozzle 321 communicate with each other. The communication plate 315 is provided with a first manifold portion 317 and a second manifold portion 318 that form a part of a manifold 400 that serves as a common liquid chamber with which the plurality of pressure chambers 312 communicate. The first manifold portion 317 is provided to penetrate the communication plate 315 in the Z-axis direction. The second manifold portion 318 is provided to be open on the surface on the +Z direction side without penetrating the communication plate 315 in the Z-axis direction.

The communication plate 315 is provided with a supply communication path 319 communicating with a first end portion of the pressure chamber 312 in the X-axis direction independently of each of the pressure chambers 312. The supply communication path 319 causes the second manifold portion 318 to communicate with each of the pressure chambers 312, and supplies the ink in the manifold 400 to each pressure chamber 312.

As the communication plate 315, a silicon substrate, a glass substrate, an SOI substrate, various ceramic substrates, a metal substrate, or the like may be used. Examples of the metal substrate include a stainless steel substrate. It is preferable that the communication plate 315 is formed by using a material having a thermal expansion coefficient substantially the same as a thermal expansion coefficient of the pressure chamber substrate 310. As a result, when the temperatures of the pressure chamber substrate 310 and the communication plate 315 change, it is possible to suppress the warpage of the pressure chamber substrate 310 and the communication plate 315 due to a difference between the thermal expansion coefficients. The nozzle plate 320 is provided on the surface the communication plate 315 on the opposite side to the pressure chamber substrate 310, that is, on the surface on the +Z direction side. The nozzle plate 320 is provided with nozzles 321 communicating with the respective pressure chambers 312 via the nozzle communication paths 316.

In the present embodiment, a plurality of nozzles 321 are disposed to be arranged in a row in the Y-axis direction. The nozzle plate 320 is provided with two nozzle rows with a gap in the X-axis direction in which the plurality of nozzles 321 are arranged in a row. The two nozzle rows correspond to the first pressure chamber row and the second pressure chamber row, respectively. That is, the plurality of nozzles 321 in each row are disposed such that positions in the X-axis direction are the same position. The disposition of the nozzle 321 is not particularly limited. For example, the nozzles 321 disposed to be arranged in the Y-axis direction may be disposed at positions shifted in the X-axis direction for every other nozzle 321.

A material of the nozzle plate 320 is not particularly limited, and for example, a silicon substrate, a glass substrate, an SOI substrate, various ceramic substrates, and a metal substrate may be used. Examples of the metal substrate include a stainless steel substrate. As a material of the nozzle plate 320, an organic substance such as a polyimide resin may be used. However, it is preferable to use a material for the nozzle plate 320 that has substantially the same thermal expansion coefficient as the thermal expansion coefficient of the communication plate 315. As a result, when the temperatures of the nozzle plate 320 and the communication plate 315 change, it is possible to suppress the warpage of the nozzle plate 320 and the communication plate 315 due to a difference in the thermal expansion coefficient.

The compliance substrate 345 is provided together with the nozzle plate 320 on the surface of the communication plate 315 on the opposite side to the pressure chamber substrate 310, that is, on the surface on the +Z direction side. The compliance substrate 345 is provided around the nozzle plate 320 and seals the openings of the first manifold portion 317 and the second manifold portion 318 provided in the communication plate 315. The compliance substrate 345 includes a sealing film 346 formed of a flexible thin film and a fixed substrate 347 made of a hard material such as metal. A region of the fixed substrate 347 facing the manifold 400 is an opening portion 348 completely removed in the thickness direction. Thus, one surface of the manifold 400 is a compliance portion 349 sealed only by the flexible sealing film 346.

On the other hand, on the surface of the pressure chamber substrate 310 on the opposite side to the nozzle plate 320 or the like, that is, on the surface on the −Z direction side, the vibration plate 350 and the piezoelectric element 60 that bends and deforms the vibration plate 350 to cause a pressure change in the ink inside the pressure chamber 312, which will be described in detail later, are stacked. In other words, the vibration plate 350 is provided in the +Z-axis direction of the Z-axis direction with respect to the piezoelectric element 60, and the pressure chamber substrate 310 is provided in the +Z-axis direction of the Z-axis direction with respect to the vibration plate 350. Note that FIG. 15 is a diagram for describing the overall configuration of the ejection module 22, and the configuration of the piezoelectric element 60 is simplified and illustrated.

The protective substrate 330 having substantially the same size as that of the pressure chamber substrate 310 is further bonded to the surface of the pressure chamber substrate 310 on the −Z direction side via an adhesive or the like. The protective substrate 330 has a holding portion 331 that is a space for protecting the piezoelectric element 60. The holding portions 331 are provided independently for each row of the piezoelectric elements 60 disposed to be arranged in the Y-axis direction, and two holding portions 331 are formed to be arranged in the X-axis direction. The protective substrate 330 is provided with a through-hole 332 penetrating in the Z-axis direction between the two holding portions 331 disposed to be arranged in the X-axis direction.

The case member 340 for defining the manifold 400 communicating with the plurality of pressure chambers 312 together with the pressure chamber substrate 310 is fixed on the protective substrate 330. The case member 340 has substantially the same shape as that of the communication plate 315 described above in a plan view in the +Z direction, and is bonded to the protective substrate 330 and also to the communication plate 315 described above.

Such a case member 340 has an accommodating portion 341 that is a space having a depth configured to accommodate the pressure chamber substrate 310 and the protective substrate 330 on the side of the protective substrate 330. The accommodating portion 341 has an opening area wider than the surface of the protective substrate 330 bonded to the pressure chamber substrate 310. The opening surface of the accommodating portion 341 on the side of the nozzle plate 320 is sealed by the communication plate 315 in a state in which the pressure chamber substrate 310 and the protective substrate 330 are accommodated in the accommodating portion 341.

In the case member 340, third manifold portions 342 are defined on both of the outsides of the accommodating portion 341 in the X-axis direction. The manifold 400 is constituted with the first manifold portion 317 and the second manifold portion 318 provided on the communication plate 315, and the third manifold portion 342. The manifold 400 is continuously provided in the Y-axis direction, and the supply communication paths 319 via which each of the pressure chambers 312 and the manifold 400 communicate with each other are disposed to be arranged in the Y-axis direction.

The case member 340 is provided with a supply port 344 that communicates with the manifolds 400 to supply ink to each of the manifolds 400. The case member 340 is provided with a coupling port 343 that communicates with the through-hole 332 of the protective substrate 330 and into which the wiring substrate 420 is inserted.

In the ejection module 22 of the present embodiment, after the ink stored in the ink container 2 is incorporated from the supply port 344 and the inside from the manifold 400 to the nozzle 321 is filled with the ink, the drive signal VOUT based on the drive signal COM is supplied from the integrated circuit 421 including the drive signal selection circuit 200 to each of the piezoelectric elements 60 corresponding to the pressure chamber 312. As a result, the vibration plate 350 is bent and deformed together with the piezoelectric element 60, the pressure in each pressure chamber 312 increases, and the ink is ejected from each nozzle 321. The print head 20 is configured to have a plurality of the above-described ejection modules 22.

Next, a configuration of the pressure chamber substrate 310 including the vibration plate 350 and the piezoelectric element 60 described above, which are stacked and formed on the −Z-axis direction side, will be described in detail. The ejection module 22 has an individual lead electrode 391, a common lead electrode 392, a measurement lead electrode 393, and a resistance wiring 401 as constituents stacked on the −Z-axis direction side of the pressure chamber substrate 310, in addition to the vibration plate 350 and the piezoelectric element 60.

As illustrated in FIGS. 15 to 17, the vibration plate 350 includes an elastic film 351, which is made of silicon oxide, provided on the side of the pressure chamber substrate 310, and an insulator film 352, which is made of a zirconium oxide film, provided on the elastic film 351. The liquid flow path of the pressure chamber 312 or the like is formed through anisotropic etching of the pressure chamber substrate 310 from the surface on the +Z direction side, and the surface of the liquid flow path of the pressure chamber 312 or the like on the −Z direction side is formed of the elastic film 351.

A configuration of the vibration plate 350 is not particularly limited. The vibration plate 350 may be formed of, for example, either the elastic film 351 or the insulator film 352, and may further include other films other than the elastic film 351 and the insulator film 352. Examples of a material of the other film include silicon and silicon nitride.

The piezoelectric element 60 is an example of a piezoelectric actuator that causes a pressure change in the ink in the pressure chamber 312. The piezoelectric element 60 has a first electrode 360, a piezoelectric body 370, and a second electrode 380 sequentially stacked from the +Z-axis direction side that is the vibration plate 350 side toward the −Z-axis direction side. In other words, the piezoelectric element 60 includes the first electrode 360, the second electrode 380, and the piezoelectric body 370, and the piezoelectric body 370 is provided between the first electrode 360 and the second electrode 380 in the Z-axis direction in which the first electrode 360, the second electrode 380, and the piezoelectric body 370 are stacked.

Both the first electrode 360 and the second electrode 380 are electrically coupled to the wiring substrate 420, and supply the drive signal VOUT supplied from the drive signal selection circuit 200 included in the integrated circuit 421 mounted on the wiring substrate 420 and the reference voltage signal VBS propagating through the wiring substrate 420, to the piezoelectric body 370. A different drive signal VOUT is supplied to the first electrode 360 according to an ejection amount of ink, and the constant reference voltage signal VBS is supplied to the second electrode 380 regardless of an ejection amount of ink. As a result, a potential difference is generated between the first electrode 360 and the second electrode 380, and thus the piezoelectric body 370 is deformed. That is, when the piezoelectric element 60 is driven, the vibration plate 350 is deformed or vibrated, and the volume of the pressure chamber 312 changes, so that pressure is applied to the ink stored in the pressure chamber 312. As a result, the ink is ejected from the nozzle 321 via the nozzle communication path 316. In this case, a volume change amount of the pressure chamber 312 is an ink ejection amount.

When a voltage is applied between the first electrode 360 and the second electrode 380 in the piezoelectric element 60, a portion at which piezoelectric distortion occurs in the piezoelectric body 370 will be referred to as an active portion 410. On the other hand, a portion where piezoelectric distortion does not occur in the piezoelectric body 370 will be referred to as an inactive portion 415. That is, in the piezoelectric element 60, a portion where the piezoelectric body 370 is interposed between the first electrode 360 and the second electrode 380 is the active portion 410, and a portion where the piezoelectric body 370 is not interposed between the first electrode 360 and the second electrode 380 is the inactive portion 415. When the piezoelectric element 60 is driven, a portion that is displaced in the Z-axis direction will be referred to as a flexible portion, and a portion that is not displaced in the Z direction will be referred to as a non-flexible portion. That is, in the piezoelectric element 60, a portion facing the pressure chamber 312 in the Z-axis direction is the flexible portion, and an outer portion of the pressure chamber 312 is the non-flexible portion. The active portion 410 will also be referred to as a proactive portion, and the inactive portion 415 will also be referred to as a passive portion.

Generally, one electrode of the active portion 410 is configured as an independent individual electrode for each active portion 410, and the other electrode is configured as a common electrode common to a plurality of active portions 410. In the present embodiment, the first electrode 360 is configured as an individual electrode, and the second electrode 380 is configured as a common electrode.

Specifically, the first electrode 360 is provided on the +Z-axis direction side in the Z-axis direction with respect to the piezoelectric body 370, is separated for each pressure chamber 312, and configures an individual electrode that is independent for each active portion 410. The first electrode 360 is individually provided for the plurality of pressure chambers 312. The first electrode 360 is formed to have a width smaller than the width of the pressure chamber 312 in the Y-axis direction. That is, the end portion of the first electrode 360 is located on the inside of the region facing the pressure chamber 312 in the Y-axis direction.

An end portion 360*a* in the +X direction and an end portion 360*b* in the −X direction of the first electrode 360 are disposed on the outside of the pressure chamber 312. For example, in the first pressure chamber row, as illustrated in FIG. 16, the end portion 360*a* of the first electrode 360 is disposed at a position further toward the +X direction side than the end portion 312*a* of the pressure chamber 312 in the +X direction. The end portion 360*b* of the first electrode 360 is disposed at a position further toward the −X direction side than the end portion 312*b* of the pressure chamber 312 in the −X direction.

A material of the first electrode 360 is not particularly limited, and, for example, metals such as platinum (Pt), iridium (Ir), gold (Au), and titanium (Ti), and conductive materials including conductive metal oxides such as indium tin oxide abbreviated to ITO may be used. Alternatively, a plurality of materials such as platinum (Pt), iridium (Ir), gold (Au), and titanium (Ti) may be stacked and formed. In the present embodiment, platinum (Pt) is used as the first electrode 360.

As illustrated in FIG. 14, the piezoelectric body 370 is continuously provided in the Y-axis direction with a length in the X-axis direction as a predetermined length. That is, the piezoelectric body 370 has a predetermined thickness and is continuously provided in the direction in which the pressure chambers 312 are arranged. A thickness of the piezoelectric body 370 is not particularly limited, and may be about 1000 nanometers to 4000 nanometers.

As illustrated in FIG. 16, a length of the piezoelectric body 370 in the X-axis direction is larger than a length of the pressure chamber 312 in the X-axis direction that is a longitudinal direction. Therefore, on both sides of the pressure chamber 312 in the X-axis direction, the piezoelectric body 370 extends to the outside of the pressure chamber 312. As described above, the piezoelectric body 370 extends to the outside of the pressure chamber 312 in the X-axis direction, and thus the strength of the vibration plate 350 is improved. Therefore, when the active portion 410 is driven to displace the piezoelectric element 60, it is possible to suppress the occurrence of cracks or the like in the vibration plate 350 or the piezoelectric element 60.

As illustrated in FIG. 16, the end portion 370*a* of the piezoelectric body 370 in the +X direction is located toward the +X direction side that is an outer side than the end portion 360*a* of the first electrode 360 in the first pressure chamber row. That is, the end portion 360*a* of the first electrode 360 is covered with the piezoelectric body 370. On the other hand, the end portion 370*b* of the piezoelectric body 370 in the −X direction is located toward the +X direction side which is an inner side than the end portion 360*b* of the first electrode 360, and the end portion 360*b* of the first electrode 360 is not covered with the piezoelectric body 370.

As illustrated in FIGS. 14 and 17, the piezoelectric body 370 is formed with a groove portion 371 to correspond to each of the partition walls 311 and having a thickness smaller than that of the other regions. The groove portion 371 of the present embodiment is formed by completely removing the piezoelectric body 370 in the Z-axis direction. That is, the fact that the piezoelectric body 370 has a portion having a thickness smaller than the other regions includes a case where the piezoelectric body 370 is completely removed in the Z-axis direction. Of course, the piezoelectric body 370 may be formed thinner than the other portions on the bottom surface of the groove portion 371.

The length of the groove portion 371 in the Y-axis direction, that is, a width of the groove portion 371 is the same as or larger than the width of the partition wall 311. In the present embodiment, the width of the groove portion 371 is larger than the width of the partition wall 311.

The groove portion 371 is formed in a rectangular shape in a plan view from the −Z direction side. Of course, a shape of the groove portion 371 in a plan view from the −Z direction side is not limited to a rectangular shape, and may be a polygonal shape of pentagon or more, a circular shape, an elliptical shape, or the like.

By providing the groove portion 371 in the piezoelectric body 370, the rigidity of the portion of the vibration plate 350 facing the end portion of the pressure chamber 312 in the Y-axis direction, that is, a so-called arm portion of the vibration plate 350 is suppressed, and thus the piezoelectric element 60 can be favorably displaced.

Examples of the piezoelectric body 370 include a crystal film having a perovskite structure formed on the first electrode 360 and made of a ferroelectric ceramic material exhibiting an electromechanical conversion action, that is, a so-called perovskite type crystal. As a material of the piezoelectric body 370, for example, a ferroelectric piezoelectric material such as lead zirconate titanate (PZT) or a material to which a metal oxide such as niobium oxide, nickel oxide, or magnesium oxide is added may be used. Specifically, lead titanate ($PbTiO_3$), lead zirconate titanate ($Pb(Zr,Ti)O_3$), lead zirconate ($PbZrO_3$), lead lanthanum titanate ($(Pb,La),TiO_3$), lead lanthanum zirconate titanate ($(Pb,La)(Zr,Ti)O_3$), lead magnesium niobate zirconate ($Pb(Zr,Ti)(Mg,Nb)O_3$), or the like may be used. In the present embodiment, lead zirconate titanate (PZT) is used as the piezoelectric body 370.

The material of the piezoelectric body 370 is not limited to a lead-based piezoelectric material containing lead, and a lead-free piezoelectric material containing no lead may also be used. Examples of the non-lead-based piezoelectric material include bismuth iron acid (($BiFeO_3$), abbreviated to "BFO"), barium titanate (($BaTiO_3$), abbreviated to "BI"), potassium sodium niobate (($(K,Na)(NbO_3)$), abbreviated to "KNN"), potassium sodium lithium niobate (($(K,Na,Li)(NbO_3)$)), potassium sodium lithium tantalate niobate ($(K,Na,Li)(Nb,Ta)O_3$), bismuth potassium titanate (($(Bi_{1/2}K_{1/2})TiO_3$, abbreviated to "BKT"), bismuth sodium titanate (($(Bi_{1/2}Na_{1/2})TiO_3$, abbreviated to "BNT"), bismuth manganate ($BiMnO_3$, abbreviated to "BM"), a composite oxide containing bismuth, potassium, titanium, and iron and having a perovskite structure ($x[(Bi_xK_{i-x})TiO_3]-(1-x)[BiFeO_3]$, abbreviated to "BKT-BF"), a composite oxide containing bismuth, iron, barium, and titanium and having a perovskite structure ($(1-x)[BiFeO_3]-x[BaTiO_3]$, abbreviated to "BFO-BT"), and a material ($(1-x)[Bi(Fe_{1-y}M_y)O_3]-x[BaTiO_3]$, M being Mn, Co, or Cr), which is obtained by adding metals such as manganese, cobalt, and chromium to the composite oxide.

As illustrated in FIGS. 14, 16, and 17, the second electrode 380 is provided on the −Z direction side of the Z-axis direction which is the opposite side to the first electrode 360 with respect to the piezoelectric body 370, and is configured as a common electrode common to the plurality of active portions 410. The second electrode 380 is provided in common to the plurality of pressure chambers 312. The second electrode 380 is continuously provided in the Y-axis direction with a length in the X-axis direction as a predetermined length. The second electrode 380 is also provided on the inner surface of the groove portion 371, that is, on the side surface of the groove portion 371 of the piezoelectric body 370, and on the insulator film 352 which is the bottom surface of the groove portion 371. Regarding the inside of the groove portion 371, the second electrode 380 may be provided only on a part of the inner surface of the groove portion 371, or does not need to be provided over the entire surface of the inner surface of the groove portion 371.

As illustrated in FIG. 16, in the first pressure chamber row, the end portion **380*a* of the second electrode 380 in the +X direction is disposed toward the +X direction side that is an outer side than the end portion 360*a* of the first electrode 360 covered with the piezoelectric body 370. That is, the end portion 380*a* of the second electrode 380 is located toward the +X-axis direction side that is an outer side than end portion 312*a* of the pressure chamber 312, and toward the +X-axis direction side that is an outer side than the end portion 360*a* of the first electrode 360. In the present embodiment, the end portion 380*a* of the second electrode 380 substantially coincides with the end portion 370*a* of the piezoelectric body 370 in the X-axis direction. Accordingly, the end portion of the active portion 410 in the +X direction, that is, the boundary between the active portion 410 and the inactive portion 415 is defined by the end portion 360*a* of the first electrode 360**.

The end portion **380*b* of the second electrode 380 in the −X direction is disposed toward the −X direction side that is an outer side than the end portion 312*b* of the pressure chamber 312 in the −X direction, and is disposed toward the +X direction side that is an inner side than the end portion 370*b* of the piezoelectric body 370. As described above, the end portion 370*b* of the piezoelectric body 370 is located toward the +X direction side that is an inner side than the end portion 360*b* of the first electrode 360. Therefore, the end portion 380*b* of the second electrode 380 is located on the piezoelectric body 370 further toward the +X direction side than the end portion 360*b* of the first electrode 360. There is a portion to which the surface of the piezoelectric body 370 is exposed on the end portion 380*b* of the second electrode 380** on the −X direction side.

As described above, the end portion **380*b* of the second electrode 380 is disposed further toward the +X direction side than the end portion 370*b* of the piezoelectric body 370 and the end portion 360*b* of the first electrode 360. Therefore, the end portion of the active portion 410 in the −X direction, that is, the boundary between the active portion 410 and the inactive portion 415 is defined by the end portion 380*b* of the second electrode 380**.

A material of the second electrode 380 is not particularly limited, but, similar to the first electrode 360, for example, metals such as platinum (Pt), iridium (Ir), gold (Au), and titanium (Ti), and conductive materials including conductive metal oxides such as indium tin oxide abbreviated to ITO may be used. Alternatively, a plurality of materials such as platinum (Pt), iridium (Ir), gold (Au), and titanium (Ti) may be stacked and formed. In the present embodiment, iridium (Ir) is used as the second electrode 380.

On the outside of the end portion **380*b* of the second electrode 380, that is, further in the −X direction of the end portion 380*b* of the second electrode 380, a wiring portion 385 that is formed at the same layer as the second electrode 380 but is electrically decoupled from the second electrode 380 is provided. The wiring portion 385 is formed from above of the piezoelectric body 370 to above of the first electrode 360 extending further in the −X direction than the piezoelectric body 370** in a state in which the wiring portion

385 is spaced not to be in contact with the end portion 380*b* of the second electrode 380. The wiring portion 385 is provided independently for each of the active portions 410. That is, a plurality of wiring portions 385 are disposed at predetermined intervals in the Y-axis direction. The wiring portion 385 may be formed of a layer different from that of the second electrode 380, but is preferably formed of the same layer as the second electrode 380. As a result, manufacturing steps of the wiring portion 385 can be simplified and the cost can be reduced.

For the first electrode 360 and the second electrode 380 configuring the piezoelectric element 60, the individual lead electrode 391 is electrically coupled to the first electrode 360 and the common lead electrode 392 that is a driving common electrode is electrically coupled to the second electrode 380. The flexible wiring substrate 420 is electrically coupled to the end portions of the individual lead electrode 391 and the common lead electrode 392 on the opposite side to the end portions coupled to the piezoelectric element 60. The control mechanism 10, the temperature information output circuit 26, and a plurality of wirings for coupling to a plurality of circuits (not illustrated) are formed on the wiring substrate 420. In the present embodiment, the wiring substrate 420 is configured with, for example, a flexible printed circuit (FPC). Any flexible substrate such as flexible flat cable (FFC) may be used instead of an FPC.

In the present embodiment, the individual lead electrode 391 and the common lead electrode 392 extend to be exposed in the through-hole 332 formed in the protective substrate 330, and are electrically coupled to the wiring substrate 420 in the through-hole 332. The integrated circuit 421 on which the drive signal selection circuit 200 that outputs the drive signal VOUT for driving the piezoelectric element 60 is mounted is mounted on the wiring substrate 420.

In the present embodiment, the individual lead electrode 391 and the common lead electrode 392 are formed at the same layer, but are formed to be electrically decoupled from each other. As a result, manufacturing steps can be simplified and the cost can be reduced compared with when the individual lead electrode 391 and the common lead electrode 392 are individually formed. Of course, the individual lead electrode 391 and the common lead electrode 392 may be formed at different layers.

A material of the individual lead electrode 391 and the common lead electrode 392 is not particularly limited as long as the material is conductive. For example, gold (Au), copper (Cu), titanium (Ti), tungsten (W), nickel (Ni), chromium (Cr), platinum (Pt), aluminum (Al), and the like may be used. In the present embodiment, gold (Au) is used as the individual lead electrode 391 and the common lead electrode 392. The individual lead electrode 391 and the common lead electrode 392 may have an adhesion layer for improving the adhesion with the first electrode 360, the second electrode 380, and the vibration plate 350.

The individual lead electrode 391 is provided for each active portion 410, that is, for each first electrode 360. As illustrated in FIG. 16, for example, in the first pressure chamber row, the individual lead electrode 391 is coupled to the vicinity of the end portion 360*b* of the first electrode 360 provided on the outside of the piezoelectric body 370 via the wiring portion 385, and is drawn out in the −X-axis direction to above of the pressure chamber substrate 310 and actually to above of the vibration plate 350.

On the other hand, as illustrated in FIG. 14, for example, in the first pressure chamber row, the common lead electrode 392 is drawn out in the −X direction from above of the second electrode 380 configuring the common electrode on the piezoelectric body 370 to above of the vibration plate 350, at both end portions in the Y-axis direction. The common lead electrode 392 has an extension portion 392*a* and an extension portion 392*b*. As illustrated in FIGS. 14 and 16, for example, in the first pressure chamber row, the extension portion 392*a* extends in the Y-axis direction in a region corresponding to the end portion 312*a* of the pressure chamber 312, and the extension portion 392*b* extends in the Y-axis direction to a region corresponding to the end portion 312*b* of the pressure chamber 312. The extension portion 392*a* and the extension portion 392*b* are continuously provided with respect to the plurality of active portions 410 in the Y-axis direction.

The extension portion 392*a* and the extension portion 392*b* extend from the inside of the pressure chamber 312 to the outside of the pressure chamber 312 in the X-axis direction. In the present embodiment, the active portion 410 of the piezoelectric element 60 extends to the outside of the pressure chamber 312 at both end portions of the pressure chamber 312 in the X-axis direction, and the extension portion 392*a* and the extension portion 392*b* extend to the outside of the pressure chamber 312 on the active portion 410.

As illustrated in FIG. 16, the resistance wiring 401 is provided on the surface of the vibration plate 350 on the −Z-axis direction side. The resistance wiring 401 configures at least a part of the temperature detection circuit 24 that detects the temperature of the pressure chamber 312. In the present embodiment, the temperature detection circuit 24 detects a temperature by using the characteristics that an electric resistance value of a metal, a semiconductor, or the like changes depending on the temperature. A material of the resistance wiring 401 is not particularly limited as long as the material has an electric resistance value that is temperature dependent. For example, gold (Au), platinum (Pt), iridium (Ir), aluminum (Al), copper (Cu), titanium (Ti), tungsten (W), nickel (Ni), and chromium (Cr) may be used. Here, platinum (Pt) may be preferably used as a material for the resistance wiring 401 from the viewpoint that the change in a resistance value due to temperature is large and stability and accuracy are high. In the present embodiment, the resistance wiring 401 is provided at the same layer as the first electrode 360, and is stacked and formed on the surface of the vibration plate 350 on the −Z-axis direction side to be electrically decoupled from the first electrode 360. Therefore, a material of the resistance wiring 401 is platinum (Pt) that is the same as that of the first electrode 360. As a result, manufacturing steps can be simplified and the cost can be reduced compared with when the resistance wiring 401 is formed separately from the first electrode 360. Of course, the resistance wiring 401 may be formed at a layer different from that of the first electrode 360.

As illustrated in FIG. 14, the resistance wiring 401 is continuous, and the first end of the resistance wiring 401 on the +X-axis direction side in the X-axis direction is coupled to the measurement lead electrode 393*a*, and the second end of the resistance wiring 401 on the −X-axis direction side in the X-axis direction is coupled to the measurement lead electrode 393*b*. The measurement lead electrodes 393*a* and 393*b* are electrically coupled to the wiring substrate 420. As a result, the resistance wiring 401 is electrically coupled to the temperature information output circuit 26, and the temperature information output circuit 26 can measure an electric resistance value of the resistance wiring 401. In the present embodiment, the resistance wiring 401 is covered with the piezoelectric body 370, and is located between the vibration plate 350 and the piezoelectric body 370 in the Z-axis direction.

The resistance wiring 401 includes a first pressure chamber row side meandering pattern on the +X-axis direction side in the X-axis direction and a second pressure chamber row side meandering pattern on the −X-axis direction side in the X-axis direction. The first pressure chamber row side meandering pattern meanders in the Y-axis direction at a position overlapping the supply communication path 319 communicating with each pressure chamber 312 configuring the first pressure chamber row when viewed from the −Z-axis direction. The second pressure chamber row side meandering pattern meanders in the Y-axis direction at a position overlapping the supply communication path 319 communicating with each pressure chamber 312 configuring the second pressure chamber row when viewed from the −Z-axis direction. That is, the resistance wiring 401 has the first pressure chamber row side meandering pattern corresponding to the first pressure chamber row formed by the plurality of pressure chambers 312 and the second pressure chamber row side meandering pattern corresponding to the second pressure chamber row formed by the plurality of pressure chambers 312. As illustrated in FIGS. 15 and 16, a distance between the end portion of the pressure chamber 312 on the −Z-axis direction side and the resistance wiring 401 in the Z-axis direction is smaller than a dimension of the pressure chamber 312 in the Z-axis direction. For example, in the first pressure chamber row, the longest distance in the X-axis direction between the end portion 312*a* of the pressure chamber 312 in the +X direction and the resistance wiring 401 is smaller than the dimension of the pressure chamber 312 in the X-axis direction. Therefore, the electric resistance value of the resistance wiring 401 is likely to change in response to a temperature change of the pressure chamber 312.

In the present embodiment, the measurement lead electrode 393 including the measurement lead electrode 393*a* and the measurement lead electrode 393*b* is formed at the same layer as the individual lead electrode 391 and the common lead electrode 392, but is electrically decoupled. As a result, manufacturing steps can be simplified and the cost can be reduced compared with when the measurement lead electrode 393 is individually formed with the individual lead electrode 391 and the common lead electrode 392. Of course, the measurement lead electrode 393 may be formed at a layer different from the individual lead electrode 391 and the common lead electrode 392.

A material of the measurement lead electrode 393 is not particularly limited as long as the material is conductive. For example, gold (Au), copper (Cu), titanium (Ti), tungsten (W), nickel (Ni), chromium (Cr), platinum (Pt), and aluminum (Al) may be used. In the present embodiment, gold (Au) is used as the measurement lead electrode 393. The material of the measurement lead electrode 393 is the same as the material of the individual lead electrode 391 and the common lead electrode 392. The measurement lead electrode 393 may have an adhesion layer that improves adhesion to the resistance wiring 401 and the vibration plate 350.

In the present embodiment, the measurement lead electrode 393 extends to be exposed in the through-hole 332 formed in the protective substrate 330, and is electrically coupled to the wiring substrate 420 in the through-hole 332. As a result, the temperature information output circuit 26 can acquire an electric resistance value of the resistance wiring 401 via the wiring substrate 420. The temperature information output circuit 26 outputs the acquired electric resistance value of the resistance wiring 401 as the temperature information signal TI in response to the temperature acquisition request signal TD from the control circuit 100. The temperature information output circuit 26 may store in advance a correspondence relationship between an electric resistance value of the resistance wiring 401 and a temperature. The temperature information output circuit 26 may output a temperature corresponding to the electric resistance value of the resistance wiring 401 as the temperature information signal TI in response to the temperature acquisition request signal TD from the control circuit 100.

For example, when the temperature detection circuit 24 is provided outside the ejection module 22, a difference between a temperature measured by the temperature detection circuit 24 and a temperature inside the pressure chamber 312 may be larger than a difference between a temperature inside the ejection module 22 and a temperature inside the pressure chamber 312. In this case, the correction control for correcting the control signals Ctrl-H, Ctrl-C, and Ctrl-T based on the temperature information signal TI in the control circuit 100 may be reduced, and thus the optimum ejection control for the ejection module 22 suitable for the temperature of the ink in the pressure chamber 312 may not be performed. In the present embodiment, the resistance wiring 401 is provided in a stacked manner on the vibration plate 350 located inside the ejection module 22. As a result, a difference between a temperature detected based on an electric resistance value of the resistance wiring 401 that is the temperature detection circuit 24 and a temperature inside the pressure chamber 312 can be reduced, and thus the detection accuracy of a temperature of the pressure chamber 312 detected by the temperature detection circuit 24 is improved. As a result, the ejection control for the ejection module 22 suitable for a temperature of ink in the pressure chamber 312 can be performed by the control circuit 100.

That is, in the print head 20 of the present embodiment, the ejection module 22 includes the piezoelectric element 60 that includes the first electrode 360, the second electrode 380, and the piezoelectric body 370, and in which the piezoelectric body 370 is located between the first electrode 360 and the second electrode 380 in the Z-axis direction which is a stacking direction in which the first electrode 360, the second electrode 380, and the piezoelectric body 370 are stacked, and that is driven by receiving the drive signal VOUT based on the drive signal COM; the vibration plate 350 that is located on the +Z-axis direction side that is one side of the Z-axis direction that is the stacking direction with respect to the piezoelectric element 60 and is deformed by driving the piezoelectric element 60; the pressure chamber substrate 310 that is located on the +Z-axis direction side that is one side of the Z-axis direction which is the stacking direction with respect to the vibration plate 350, and is provided with a plurality of pressure chambers 312 each of which a volume changes due to deformation of the vibration plate 350; the drive signal selection circuit 200 that switches whether or not to supply the drive signal COM to the piezoelectric element 60; the wiring substrate 420 that is provided with the integrated circuit 421 including the drive signal selection circuit 200; and the resistance wiring 401 that is located on the −Z-axis direction side that is the other side of the Z-axis direction which is the stacking direction with respect to the vibration plate 350, is electrically coupled to the wiring substrate 420, and configures at least a part of the temperature detection circuit 24 that detects temperature information of the pressure chamber 312.

As a result, a difference between a temperature detected based on an electric resistance value of the resistance wiring 401 that is the temperature detection circuit 24 and a temperature inside the pressure chamber 312 can be reduced, and thus the detection accuracy of a temperature of the pressure chamber 312 detected by the temperature detection circuit 24 is improved. As a result, the ejection control for the ejection module 22 suitable for a temperature of ink in the pressure chamber 312 can be performed by the control circuit 100.

Since at least a part of the resistance wiring 401 that is the temperature detection circuit 24 is stacked on the vibration plate 350, the resistance wiring 401 that is the temperature detection circuit 24 can be disposed closer to the pressure chamber 312, and thus the accuracy of detecting a temperature of the pressure chamber 312 detected by the temperature detection circuit 24 is further improved. As a result, the ejection control for the ejection module 22 more suitable for a temperature of ink in the pressure chamber 312 in the control circuit 100 can be performed.

6. TEMPERATURE DETECTION OPERATION

As described above, in the liquid ejection apparatus 1 of the present embodiment, the resistance wiring 401 that detects the temperature of the ejection module 22 is provided on the vibration plate 350 inside the ejection module 22 of the print head 20, and thus the resistance wiring 401 that is the temperature detection circuit 24 can be provided in the vicinity of the pressure chamber 312 in which ink is stored.

As a result, the difference between the temperature detected based on the electric resistance value of the resistance wiring 401 and the temperature inside the pressure chamber 312 can be reduced, and the detection accuracy of the temperature of the pressure chamber 312 detected by the temperature detection circuit 24 can be reduced. As a result, the signal waveform of the drive signal COM can be corrected to the optimum signal waveform according to the temperature of the pressure chamber 312 and the temperature of the ink stored in the pressure chamber 312, and as a result, the ejection accuracy of ink can be improved.

On the other hand, since the resistance wiring 401 that is the temperature detection circuit 24 is provided in the vicinity of the pressure chamber 312 in which the ink is stored, the following problems may occur.

In recent years, from the viewpoint of improving the quality of an image formed on the medium P, several hundred or more nozzles 321 are disposed at high density in the ejection module 22. Therefore, in the ejection module 22, several hundred or more piezoelectric elements 60 corresponding to the hundred or more nozzles 321 are disposed at high density, and thus, in the ejection module 22, signal wirings through which the drive signal VOUT supplied to the corresponding piezoelectric elements 60 propagate are disposed at high density. When the resistance wiring 401 is disposed on such a vibration plate 350, the resistance wiring 401 is disposed in the vicinity of the signal wiring through which the drive signal VOUT propagates. Therefore, a probability that the voltage value of the drive signal VOUT is superimposed on the signal propagating through the resistance wiring 401 increases, and when the voltage value of the drive signal VOUT is superimposed on the signal propagating through the resistance wiring 401, the detection accuracy of the temperature of the pressure chamber 312 detected by the temperature detection circuit 24 including the resistance wiring 401 is reduced.

In particular, in the drive circuit 50 as described in the present embodiment, since the drive circuit 50 modulates the basic drive signal aO corresponding to the basic drive signal dO and digitally amplifies the basic drive signal aO, the power consumption in the drive circuit 50 can be reduced. On the other hand, a high-frequency ripple voltage is superimposed on a signal waveform of the drive signal COM output by the drive circuit 50 and a signal waveform of the drive signal VOUT based on the drive signal COM. Thus, a probability that the drive signal VOUT is superimposed on the signal propagating through the resistance wiring 401 is further increased, and even when a signal waveform of the drive signal COM is corrected by using the temperature of the pressure chamber 312 detected by the temperature detection circuit 24 including the resistance wiring 401, it may become difficult to optimally correct the signal waveform of the drive signal COM.

In order to solve the problem, the liquid ejection apparatus 1 of the present embodiment has a characteristic configuration in which a frequency of the amplification modulation signal AMs when the temperature detection circuit 24 detects the temperature detection information TH used for the control circuit 100 to correct the basic drive signal dO is higher than a frequency of the amplification modulation signal AMs when the temperature detection circuit 24 detects the temperature detection information TH not used for the control circuit 100 to correct the basic drive signal dO, and the print head 20 has a characteristic configuration in which a frequency of the amplification modulation signal AMs when the temperature detection information TH detected by the temperature detection circuit 24 is output to the control circuit 100 is higher than a frequency of the amplification modulation signal AMs when the temperature detection information TH detected by the temperature detection circuit 24 is not output to the control circuit 100.

As a result, the influence of the ripple voltage on the temperature detection information TH input to the control circuit 100 is reduced, and the detection accuracy of the temperature detection information TH used for the control circuit 100 to correct the basic drive signal dO is improved. As a result, it is possible to improve the correction accuracy of the signal waveform of the drive signal COM when the signal waveform of the drive signal COM is corrected by using the temperature of the pressure chamber 312 detected by the temperature detection circuit 24 including the resistance wiring 401.

Figure 18:
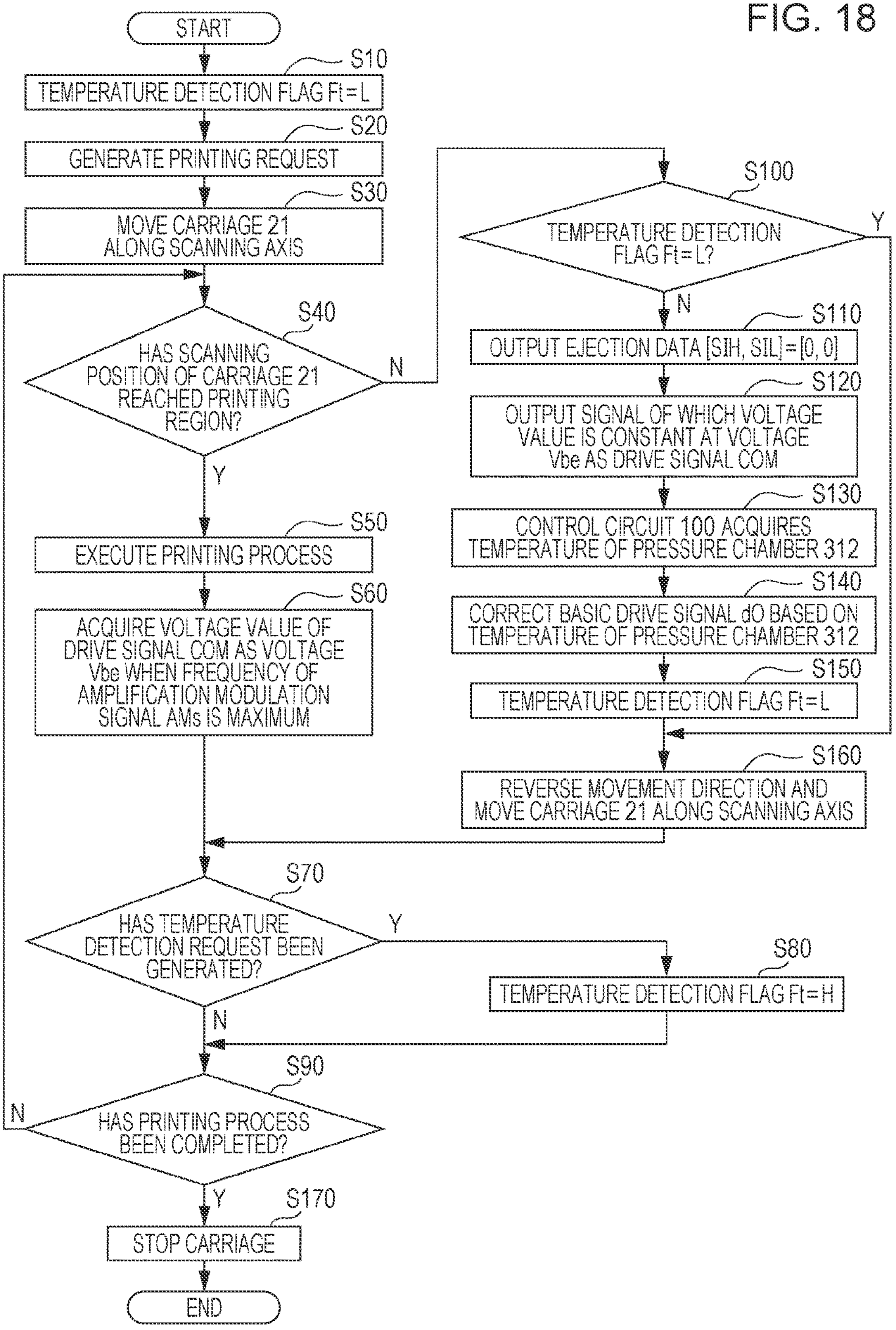
FIG. 18 is a diagram illustrating an example of an acquisition timing of acquiring the temperature of the ejection module included in the print head.

A specific operation example of the liquid ejection apparatus 1 that operates as described above will be described. FIG. 18 is a diagram illustrating an example of an acquisition timing of acquiring the temperature of the ejection module 22 included in the print head 20.

When a power supply voltage is supplied, the liquid ejection apparatus 1 is started and the operation is started. In this case, as an initial setting of the liquid ejection apparatus 1, the control circuit 100 stores a temperature detection flag Ft indicating whether or not the temperature of the pressure chamber 312 is required to be detected by the temperature detection circuit 24, as an L level indicating that the temperature is not required to be detected. That is, the control circuit 100 sets the temperature detection flag Ft="L" (step S10).

Thereafter, when a printing request for the liquid ejection apparatus 1 is generated when an image information signal including image data or the like is input from an external apparatus (step S20), the control circuit 100 outputs the control signal Ctrl-C for moving the carriage 21 along the scanning axis. As a result, the carriage 21 is moved along the scanning axis (step S30).

When the carriage 21 is moved, the linear encoder 90 outputs a detection signal based on a scanning position of the carriage 21 to the control circuit 100. The control circuit 100 determines whether or not the scanning position of the print head 20 that is also a scanning position of the carriage 21 has reached a printing region based on the input detection signal (step S40). Here, the printing region is a region in which the print head 20 mounted on the carriage 21 ejects ink onto the medium P, and is a region defined based on a scanning range of the carriage 21 or a width of the transported medium P in the direction along the scanning axis. In the following description, a region other than the above-described printing region within the scanning range of the carriage 21 will be referred to as a non-printing region.

When the control circuit 100 determines that the scanning position of the carriage 21 has reached the printing region (Y in step S40), the liquid ejection apparatus 1 executes a printing process (step S50). The printing process is a process in which the print head 20 ejects ink to a desired position on the medium P to form a desired image on the medium P, and includes, for example, a process in which the control circuit 100 outputs the head control signal DI corresponding to the image data input from an external apparatus to the print head 20.

In the period in which the printing process is executed, the frequency measurement circuit 54 measures a frequency of the amplification modulation signal AMs from the drive circuit 50. The frequency measurement circuit 54 outputs the frequency determination signal Fm which is set to an H level for a certain period at the moment at which the frequency of the amplification modulation signal AMs changes from rising to falling, the moment being a timing at which the frequency of the amplification modulation signal AMs becomes maximum, to the control circuit 100. The control circuit 100 calculates a voltage value of the drive signal COM at the moment at which the frequency determination signal Fm is set to an H level based on the basic drive signal dO that is output at the moment at which the frequency determination signal Fm is set to an H level. The control circuit 100 stores the calculated voltage value of the drive signal COM as a voltage Vbe. That is, the control circuit 100 acquires the voltage value of the drive signal COM when the frequency of the amplification modulation signal AMs is the maximum as the voltage Vbe (step S60).

Here, in FIG. 18, step S50 and step S60 are described as if step S60 is executed after the execution of step S50, but in the period in which the printing process is executed in step S50, a voltage value of the drive signal COM when the frequency of the amplification modulation signal AMs shown in step S60 is the maximum may be acquired.

After the printing process and the acquisition of the voltage value of the drive signal COM when the frequency of the amplification modulation signal AMs is the maximum are completed, the control circuit 100 determines whether or not a request for the temperature detection circuit 24 detecting the temperature of the pressure chamber 312 based on a usage status of the liquid ejection apparatus 1 or a request from a user has been generated (step S70). When the control circuit 100 determines that the request for the temperature detection circuit 24 detecting the temperature of the pressure chamber 312 has been generated (Y in step S70), the control circuit 100 stores the temperature detection flag Ft to an H level indicating that the temperature of the pressure chamber 312 is required to be detected by the temperature detection circuit 24. That is, the control circuit 100 sets the temperature detection flag Ft="H" (step S80).

When the control circuit 100 determines that the request for the temperature detection circuit 24 detecting the temperature of the pressure chamber 312 has not been generated (N in step S70), or when the control circuit 100 determines that the request for the temperature detection circuit 24 detecting the temperature of the pressure chamber 312 has been generated and then the temperature detection flag is set to Ft="H" (step S80), the control circuit 100 determines whether or not the printing process corresponding to the image data input from the external apparatus has been completed (step S90).

When the control circuit 100 determines that the printing process has not been completed (N in step S90), the control circuit 100 determines again whether or not the scanning position of the carriage 21, that is, the scanning position of the print head 20 has reached the printing region based on the input detection signal (step S40). On the other hand, when the control circuit 100 determines that the printing process has been completed (Y in step S90), the control circuit 100 stops the movement of the carriage 21 (step S170), and the liquid ejection apparatus 1 stops the operation thereof.

When the control circuit 100 determines that the scanning position of the carriage 21 has not reached the printing region (N in step S40), that is, when the control circuit 100 determines that the scanning position of the carriage 21 has reached the non-printing region, the control circuit 100 determines whether or not the temperature detection flag Ft to be stored is set to an L level indicating that the temperature of the pressure chamber 312 is not required to be detected by the temperature detection circuit 24 (step S100).

When the temperature detection flag Ft stored in the control circuit 100 is set to an H level (N in step S100), the control circuit 100 outputs all of the ejection data [SIH, SIL] included in the ejection control signal SI of the head control signal DI as ejection data [SIH, SIL]=[0, 0] (step S110). As a result, all the selection circuits 230 included in the drive signal selection circuit 200 are controlled to be non-conductive.

Thereafter, the control circuit 100 reads the voltage Vbe acquired in step S60, and outputs the basic drive signal dO for outputting the drive signal COM of which a voltage value is constant at the voltage Vbe. As a result, the drive circuit 50 outputs a signal of which a voltage value is constant at the voltage Vbe as the drive signal COM (step S120). Thereafter, the control circuit 100 generates a temperature acquisition request signal TD for acquiring the temperature of the ejection module 22 included in the print head 20, and outputs the temperature acquisition request signal TD to the temperature information output circuit 26. The temperature information output circuit 26 generates a temperature information signal TI corresponding to the temperature detection information TH corresponding to the temperature of the pressure chamber 312 input from the temperature detection circuit 24 based on the input temperature acquisition request signal TD, and outputs the temperature information signal TI to the control circuit 100. As a result, the control circuit 100 acquires the temperature of the pressure chamber 312 detected by the temperature detection circuit 24 (step S130).

Specifically, the temperature information output circuit 26 stores and amplifies the temperature detection information TH corresponding to the temperature of the pressure chamber 312 input from the temperature detection circuit 24 at the timing at which the temperature acquisition request signal TD is input. The signal obtained by amplifying the temperature detection information TH is output as the temperature information signal TI. That is, the temperature detection information TH corresponding to the temperature of the pressure chamber 312 detected by the temperature detection circuit 24 is input to the control circuit 100 as the temperature information signal TI. In this case, all the selection circuits 230 included in the drive signal selection circuit 200 are controlled to be non-conductive, the drive circuit 50 outputs the drive signal COM having a constant voltage value that is constant at the voltage Vbe, the drive signal COM being constant at the voltage Vbe that is a voltage value at which the frequency of the amplification modulation signal AMs is the maximum. That is, in a period in which none of the plurality of selection circuits 230 supply the drive signal COM to the plurality of piezoelectric elements 60, the period being a period in which the drive circuit 50 outputs the drive signal COM that is constant at the voltage Vbe that is a voltage value at which the frequency of the amplification modulation signal AMs is the maximum, the temperature detection information TH corresponding to the temperature of the pressure chamber 312 detected by the temperature detection circuit 24 is input to the control circuit 100. In other words, the print head 20 outputs the temperature detection information TH corresponding to the temperature of the pressure chamber 312 detected by the temperature detection circuit 24 in the period in which none of the plurality of selection circuits 230 supply the drive signal COM to the plurality of piezoelectric elements 60, the period being a period in which the drive signal COM that is constant at the voltage Vbe that is a voltage value at which the frequency of the amplification modulation signal AMs is the maximum is input.

In this case, the temperature information output circuit 26 may store all of the temperature detection information TH1 to THn output by the temperature detection circuits 24 included in the respective ejection modules 22-1 to **22-*n* at the timing at which the temperature acquisition request signal TD is input and output signals obtained by amplifying the respective pieces of temperature detection information TH1 to THn to the control circuit 100 as the temperature information signal TI, or may store the temperature detection information TH1 to THn defined by the temperature acquisition request signal TD among the pieces of temperature detection information TH1 to THn output by the temperature detection circuits 24 included in the respective ejection modules 22-1 to 22-*n* at the timing at which the temperature acquisition request signal TD is input and output signals obtained by amplifying the respective pieces of temperature detection information TH1 to THn to the control circuit 100** as the temperature information signal TI.

The control circuit 100 corrects the control signals Ctrl-H, Ctrl-C, and Ctrl-T, and the basic drive signal dO based on the temperature information signal TI including the temperature detection information TH corresponding to the temperature of the pressure chamber 312 detected by the acquired temperature detection circuit 24. That is, the control circuit 100 corrects the basic drive signal dO based on the temperature of the pressure chamber 312 (step S140). In other words, the control circuit 100 corrects the basic drive signal dO based on the temperature detection information TH corresponding to the temperature of the pressure chamber 312 detected by the temperature detection circuit 24 in a period in which the drive circuit 50 outputs the drive signal COM having a constant voltage value that is constant at the voltage Vbe when the frequency of the amplification modulation signal AMs is the maximum.

Thereafter, assuming that the acquisition of the temperature of the pressure chamber 312 of the ejection module 22 has been completed, the control circuit 100 stores the temperature detection flag Ft as an L level indicating that the temperature detection circuit 24 is not required to detect the temperature of the pressure chamber 312. That is, the control circuit 100 sets the temperature detection flag Ft="L" (step S150).

When the scanning position of the carriage is in the non-printing region and the temperature detection flag Ft stored in the control circuit 100 is set to an L level (Y in step S100), or when the acquisition of the temperature of the pressure chamber 312 in the control circuit 100 is completed and then the temperature detection flag Ft="L" is set (step S150), the scanning position of the carriage 21 reaches a predetermined region, and thus the control circuit 100 outputs the control signal Ctrl-C for reversing the movement direction of the carriage 21. As a result, the carriage 21 is moved along the scanning axis in the reversed movement direction. That is, the movement direction is reversed, and the carriage 21 is moved along the scanning axis (step S160).

After the movement direction of the carriage is reversed, the control circuit 100 determines whether or not a request for the temperature detection circuit 24 detecting the temperature of the pressure chamber 312 based on a usage status of the liquid ejection apparatus 1 or a request from a user has been generated (Step S70). When the control circuit 100 determines that the request for the temperature detection circuit 24 detecting the temperature of the pressure chamber 312 has been generated (Y in step S70), the control circuit 100 stores the temperature detection flag Ft to an H level indicating that the temperature of the pressure chamber 312 is required to be detected by the temperature detection circuit 24. That is, the control circuit 100 sets the temperature detection flag Ft="H" (step S80).

When the control circuit 100 determines that the request for the temperature detection circuit 24 detecting the temperature of the pressure chamber 312 has not been generated (N in step S70), or when the control circuit 100 determines that the request for the temperature detection circuit 24 detecting the temperature of the pressure chamber 312 has been generated and then the temperature detection flag is set to Ft="H" (step S80), the control circuit 100 determines whether or not the printing process corresponding to the image data input from the external apparatus has been completed (step S90).

When the control circuit 100 determines that the printing process has not been completed (N in step S90), the control circuit 100 determines again whether or not the scanning position of the carriage 21, that is, the scanning position of the print head 20 has reached the printing region based on the input detection signal (step S40). On the other hand, when the control circuit 100 determines that the printing process has been completed (Y in step S90), the control circuit 100 stops the movement of the carriage 21 (step S170), and the liquid ejection apparatus 1 stops the operation thereof.

Here, the control circuit 100 is an example of a basic drive signal output circuit, the configuration including the drive circuit 50 and the control circuit 100 is an example of a drive signal output circuit, and the drive signal COM is an example of a drive signal. In view of the fact that the trapezoidal waveforms Adp, Bdp, and Cdp included in the drive signal COM are supplied to the piezoelectric element 60, the trapezoidal waveforms Adp, Bdp, and Cdp included in the drive signal COM are also examples of the drive signal. The Z-axis direction is an example of a stacking direction, the +Z-axis direction side of the Z-axis direction that is the stacking direction is an example of one side of the stacking direction, and the −Z-axis direction side of the Z-axis direction that is the stacking direction is an example of the other side of the stacking direction. The selection circuit 230 is an example of a switch circuit. The temperature detection circuit 24 is an example of a temperature detection portion, and the temperature detection information TH output by the temperature detection circuit 24 is an example of temperature information.

7. ACTION AND EFFECT

As described above, in the liquid ejection apparatus 1 of the present embodiment, a frequency of the amplification modulation signal AMs when the temperature detection circuit 24 detects the temperature detection information TH used for the control circuit 100 to correct the basic drive signal dO is higher than a frequency of the amplification modulation signal AMs when the temperature detection circuit 24 detects the temperature detection information TH not used for the control circuit 100 to correct the basic drive signal dO, and thus it is possible to reduce an amplitude of a ripple voltage superimposed on the drive signal COM when the temperature detection information TH used for the control circuit 100 to correct the basic drive signal dO is acquired. That is, in the print head 20, a frequency of the amplification modulation signal AMs when the temperature detection information TH detected by the temperature detection circuit 24 is output to the control circuit 100 is higher than when a frequency of the amplification modulation signal AMs when the temperature detection information TH detected by the temperature detection circuit 24 is not output to the control circuit 100, and thus an amplitude of a ripple voltage superimposed on the input drive signal COM is reduced.

As a result, a probability that the ripple voltage superimposed on the drive signal COM is superimposed on the temperature detection information TH detected by the temperature detection circuit 24 is reduced, and the detection accuracy of the temperature detection information TH used for the control circuit 100 to correct the basic drive signal dO is improved. As a result, it is possible to improve the correction accuracy of the signal waveform of the drive signal COM when the signal waveform of the drive signal COM is corrected by using the temperature of the pressure chamber 312 detected by the temperature detection circuit 24 including the resistance wiring 401.

The control circuit 100 corrects the basic drive signal dO based on the temperature detection information TH corresponding to the temperature of the pressure chamber 312 detected by the temperature detection circuit 24 in a period in which the drive circuit 50 outputs the drive signal COM having a constant voltage value that is constant at the voltage Vbe when the frequency of the amplification modulation signal AMs is the maximum, and thus it is possible to further reduce an amplitude of a ripple voltage superimposed on the drive signal COM, and thus a probability that the ripple voltage superimposed on the drive signal COM is superimposed on the temperature detection information TH detected by the temperature detection circuit 24 is further reduced. Therefore, the detection accuracy of the temperature detection information TH used for the control circuit 100 to correct the basic drive signal dO is further improved. As a result, it is possible to further improve the correction accuracy of a signal waveform of the drive signal COM when the signal waveform of the drive signal COM is corrected by using the temperature of the pressure chamber 312 detected by the temperature detection circuit 24 including the resistance wiring 401.

8. MODIFICATION EXAMPLES

In the liquid ejection apparatus 1 of the present embodiment described above, the frequency measurement circuit 54 of the control mechanism 10 outputs the frequency determination signal Fm with an H level at a timing at which a frequency of the amplification modulation signal AMs is the maximum, and the control circuit 100 calculates a voltage value of the drive signal COM at a timing at which the frequency determination signal Fm with an H level is input. Under the control of the control circuit 100, the drive circuit 50 outputs the drive signal COM that is constant at a voltage value at which the frequency of the amplification modulation signal AMs is the maximum. As a result, when the control circuit 100 acquires the temperature detection information TH used for correcting the basic drive signal dO, the amplitude of the ripple voltage superimposed on the drive signal COM can be minimized, a probability that the ripple voltage superimposed on the drive signal COM is superimposed on the temperature detection information TH detected by the temperature detection circuit 24 is reduced, and the detection accuracy of the temperature detection information TH used for the control circuit 100 to correct the basic drive signal dO is improved.

On the other hand, from the viewpoint of improving the correction accuracy of a signal waveform of the drive signal COM when the signal waveform of the drive signal COM is corrected by using the temperature of the pressure chamber 312 detected by the temperature detection circuit 24 including the resistance wiring 401, the ripple voltage may be reduced to such an extent that a probability that the ripple voltage superimposed on at least the drive signal COM is superimposed on the temperature detection information TH detected by the temperature detection circuit 24 is reduced. Therefore, when the ripple voltage can be reduced to such an extent that the probability that the ripple voltage is superimposed on the temperature detection information TH detected by the temperature detection circuit 24 is reduced and a frequency is known, the frequency measurement circuit 54 may output the frequency determination signal Fm according to whether or not a frequency of the amplification modulation signal AMs is equal to or more than a predetermined threshold value, and the control circuit 100 control a voltage value of the drive signal COM such that the frequency of the amplification modulation signal AMs is equal to or more than the predetermined threshold value.

With such a configuration, a configuration of the frequency measurement circuit 54 can be simplified, and the control mechanism 10 and the liquid ejection apparatus 1 can be miniaturized.

In view of the fact that the drive circuit 50 self-oscillates at a frequency determined by the feedback delay of the feedback circuits 570 and 572 and the feedback transfer function, the frequency of the self-oscillation corresponds to a voltage value between the maximum voltage and the minimum voltage of an output signal from the viewpoint of circuit efficiency, waveform accuracy of the output signal, and operational stability, and is preferably maximum in the vicinity of an average voltage between the maximum voltage and the minimum voltage.

Therefore, the liquid ejection apparatus 1 may set a voltage value of the drive signal COM when the control circuit 100 acquires the temperature detection information TH used for the correction of the basic drive signal dO to be constant as an average voltage value between the voltage signal VHV having the maximum value and the ground potential having the minimum value, without including the frequency measurement circuit 54. That is, the control circuit 100 may correct the basic drive signal dO based on the temperature of the pressure chamber 312 detected by the temperature detection circuit 24 including the resistance wiring 401 when a voltage value of the drive signal COM is a voltage value obtained by dividing a sum of a voltage value of the voltage signal VHV that is the maximum voltage that can be output by the drive circuit 50 and a voltage value of the ground potential that is the minimum voltage that can be output by the drive circuit 50 by 2.

As a result, the liquid ejection apparatus 1 achieves the same actions and effects as those of the liquid ejection apparatus described in the embodiment and does not have the configuration of the frequency measurement circuit 54, the control mechanism 10 and the liquid ejection apparatus 1 can be further minimized.

Although embodiments and modification examples have been described above, the present disclosure is not limited to these embodiments, and can be implemented in various aspects without departing from the concept thereof. For example, the above embodiments can be combined as appropriate.

The present disclosure includes a configuration substantially the same as the configuration described in the embodiments (for example, a configuration having the same function, method, and result, or a configuration having the same object and effect). The present disclosure also includes a configuration in which a non-essential portion of the configuration described in the embodiment is replaced. The present disclosure includes a configuration that achieves the same action effects as the configuration described in the embodiment or a configuration that can achieve the same object. The present disclosure includes a configuration in which a well-known technique is added to the configuration described in the embodiment.

The following contents are derived from the above-described embodiments.

According to an aspect of the present disclosure, there is provided a liquid ejection apparatus including a drive signal output circuit that outputs a drive signal; and a print head that receives the drive signal and ejects a liquid, in which the print head includes a piezoelectric element that includes a first electrode, a second electrode, and a piezoelectric body and in which the piezoelectric body is located between the first electrode and the second electrode in a stacking direction in which the first electrode, the second electrode, and the piezoelectric body are stacked, and that is driven by receiving the drive signal, a vibration plate that is located on one side of the stacking direction with respect to the piezoelectric element and is deformed by driving the piezoelectric element, a pressure chamber substrate that is located on the one side of the stacking direction with respect to the vibration plate and is provided with a plurality of pressure chambers of which volumes change due to deformation of the vibration plate, a switch circuit that switches whether or not to supply the drive signal to the piezoelectric element, a wiring substrate that is provided with the switch circuit, and a temperature detection portion that is located on the other side of the stacking direction with respect to the vibration plate, is electrically coupled to the wiring substrate, and detects temperature information of the pressure chamber, the drive signal output circuit includes a modulation circuit that outputs a modulation signal obtained by modulating a basic drive signal that is a basis of the drive signal, an amplification circuit that outputs an amplification modulation signal obtained by amplifying the modulation signal, a smoothing circuit that outputs the drive signal obtained by smoothing the amplification modulation signal, a feedback circuit that feeds the drive signal back to the modulation circuit, and a basic drive signal output circuit that outputs the basic drive signal that is corrected based on the temperature information, and a frequency of the amplification modulation signal when the temperature detection portion detects the temperature information used for the basic drive signal output circuit to correct the basic drive signal is higher than a frequency of the amplification modulation signal when the temperature detection portion detects the temperature information not used for the basic drive signal output circuit to correct the basic drive signal.

According to this liquid ejection apparatus, since the temperature detection portion is provided inside the print head, the temperature information of the pressure chamber can be accurately detected, and a frequency of the amplification modulation signal when the temperature detection portion detects the temperature information used for the basic drive signal output circuit to correct the basic drive signal is higher than a frequency of the amplification modulation signal when the temperature detection portion detects the temperature information not used for the basic drive signal output circuit to correct the basic drive signal. Therefore, it is possible to reduce a ripple voltage superimposed on the drive signal that is input to the print head when the temperature detection portion detects the temperature information used for the basic drive signal output circuit to correct the basic drive signal. As a result, a probability that the ripple voltage superimposed on the drive signal interferes with the temperature information detected by the temperature detection portion and used for the drive signal output circuit to correct the basic drive signal is reduced.

In the aspect of the liquid ejection apparatus, at least a part of the temperature detection portion may be stacked on the vibration plate.

According to this liquid ejection apparatus, the temperature detection portion can be disposed closer to the pressure chamber, and the accuracy of detecting the temperature of the pressure chamber in the temperature detection portion is further improved.

In the aspect of the liquid ejection apparatus, the basic drive signal output circuit may correct the basic drive signal based on the temperature information detected by the temperature detection portion in a period in which the drive signal output circuit outputs the drive signal having a constant voltage value.

According to this liquid ejection apparatus, when the temperature detection portion detects the temperature information used for the basic drive signal output circuit to correct the basic drive signal, a probability that the drive signal interferes with the temperature information is reduced.

In the aspect of the liquid ejection apparatus,

The basic drive signal output circuit may correct the basic drive signal based on the temperature information detected by the temperature detection portion when the frequency of the amplification modulation signal is the maximum.

According to this liquid ejection apparatus, a ripple voltage superimposed on the drive signal can be further reduced.

In the aspect of the liquid ejection apparatus, the basic drive signal output circuit may correct the basic drive signal based on the temperature information detected by the temperature detection portion when a voltage value of the drive signal is a voltage value obtained by dividing a sum of a voltage value of a maximum voltage output by the drive signal output circuit and a voltage value of a minimum voltage output by the drive signal output circuit by 2.

According to this liquid ejection apparatus, it is possible to further reduce a ripple voltage superimposed on the drive signal without detecting a frequency of the amplification modulation signal.

According to another aspect, there is provided a print head that receives a drive signal output by a drive signal output circuit and ejects a liquid, the drive signal output circuit includes a modulation circuit that modulates a basic drive signal to output a modulation signal;

an amplification circuit that outputs an amplification modulation signal obtained by amplifying the modulation signal, a smoothing circuit that outputs the drive signal obtained by smoothing the amplification modulation signal, a feedback circuit that feeds the drive signal back to the modulation circuit, and a basic drive signal output circuit that outputs the basic drive signal that is corrected based on the temperature information output by the print head and is a basis of the drive signal, the print head includes a piezoelectric element that includes a first electrode, a second electrode, and a piezoelectric body and in which the piezoelectric body is located between the first electrode and the second electrode in a stacking direction in which the first electrode, the second electrode, and the piezoelectric body are stacked, and that is driven by receiving the drive signal, a vibration plate that is located on one side of the stacking direction with respect to the piezoelectric element and is deformed by driving the piezoelectric element, a pressure chamber substrate that is located on the one side of the stacking direction with respect to the vibration plate and is provided with a plurality of pressure chambers of which volumes change due to deformation of the vibration plate, a switch circuit that switches whether or not to supply the drive signal to the piezoelectric element, a wiring substrate that is provided with the switch circuit, and a temperature detection portion that is located on the other side of the stacking direction with respect to the vibration plate, is electrically coupled to first wiring substrate, and detects temperature information of the pressure chamber, in which a frequency of the amplification modulation signal when the temperature information detected by the temperature detection portion is output to the basic drive signal output circuit is higher than a frequency of the amplification modulation signal when the temperature information detected by the temperature detection portion is not output to the basic drive signal output circuit.

According to this print head, since the temperature detection portion is provided inside the print head, the temperature information of the pressure chamber can be accurately detected, and a frequency of the amplification modulation signal when the temperature detection portion detects the temperature information used for the basic drive signal output circuit to correct the basic drive signal is higher than a frequency of the amplification modulation signal when the temperature detection portion detects the temperature information not used for the basic drive signal output circuit to correct the basic drive signal. Therefore, it is possible to reduce a ripple voltage superimposed on the drive signal that is input to the print head when the temperature detection portion detects the temperature information used for the basic drive signal output circuit to correct the basic drive signal. As a result, the accuracy of the temperature information detected by the temperature detection portion and output to the drive signal output circuit is improved.

In the aspect of the print head, at least a part of the temperature detection portion may be stacked on the vibration plate.

According to this print head, the temperature detection portion can be disposed closer to the pressure chamber, and the accuracy of detecting the temperature of the pressure chamber in the temperature detection portion is further improved.

In the aspect of the print head, the temperature information detected by the temperature detection portion may be output to the basic drive signal output circuit in a period in which the drive signal output circuit outputs the drive signal having a constant voltage value.

According to this print head, when the temperature detection portion detects the temperature information used for the basic drive signal output circuit to correct the basic drive signal, a probability that the drive signal interferes with the temperature information is reduced.

In the aspect of the print head, when the frequency of the amplification modulation signal is the maximum, the temperature information detected by the temperature detection portion may be output to the basic drive signal output circuit.

According to this print head, a ripple voltage superimposed on the drive signal can be further reduced, and the signal accuracy of the output temperature information is improved.

In the aspect of the print head,

When a voltage value of the drive signal is a voltage value obtained by dividing a sum of a voltage value of a maximum voltage output by the drive signal output circuit and a voltage value of a minimum voltage output by the drive signal output circuit by 2, the temperature information detected by the temperature detection portion may be output to the basic drive signal output circuit.

According to this print head, it is possible to further reduce a ripple voltage superimposed on the drive signal without detecting a frequency of the amplification modulation signal, and the signal accuracy of the output temperature information is improved.

What is claimed is:

1. A liquid ejection apparatus comprising:

a drive signal output circuit that outputs a drive signal; and a print head that receives the drive signal and ejects a liquid, wherein the print head includes a piezoelectric element that includes a first electrode, a second electrode, and a piezoelectric body and in which the piezoelectric body is located between the first electrode and the second electrode in a stacking direction in which the first electrode, the second electrode, and the piezoelectric body are stacked, and that is driven by receiving the drive signal, a vibration plate that is located on one side of the first stacking direction with respect to the piezoelectric element and is deformed by driving the piezoelectric element, a pressure chamber substrate that is located on the one side of the stacking direction with respect to the vibration plate and is provided with a plurality of pressure chambers of which volumes change due to deformation of the vibration plate, a switch circuit that switches whether or not to supply the drive signal to the piezoelectric element, a wiring substrate that is provided with the switch circuit, and a temperature detection portion that is located on the other side of the stacking direction with respect to the vibration plate, is electrically coupled to the wiring substrate, and detects temperature information of the pressure chamber, the drive signal output circuit includes a modulation circuit that outputs a modulation signal obtained by modulating a basic drive signal that is a basis of the drive signal, an amplification circuit that outputs an amplification modulation signal obtained by amplifying the modulation signal, a smoothing circuit that outputs the drive signal obtained by smoothing the amplification modulation signal, a feedback circuit that feeds the drive signal back to the modulation circuit, and a basic drive signal output circuit that outputs the basic drive signal that is corrected based on the temperature information, and a frequency of the amplification modulation signal when the temperature detection portion detects the temperature information used for the basic drive signal output circuit to correct the basic drive signal is higher than a frequency of the amplification modulation signal when the temperature detection portion detects the temperature information not used for the basic drive signal output circuit to correct the basic drive signal.

2. The liquid ejection apparatus according to claim 1, wherein at least a part of the temperature detection portion is stacked on the vibration plate.

3. The liquid ejection apparatus according to claim 1, wherein the basic drive signal output circuit corrects the basic drive signal based on the temperature information detected by the temperature detection portion in a period in which the drive signal output circuit outputs the drive signal having a constant voltage value.

4. The liquid ejection apparatus according to claim 1, wherein the basic drive signal output circuit corrects the basic drive signal based on the temperature information detected by the temperature detection portion when the frequency of the amplification modulation signal is the maximum.

5. The liquid ejection apparatus according to claim 1, wherein the basic drive signal output circuit corrects the basic drive signal based on the temperature information detected by the temperature detection portion when a voltage value of the drive signal is a voltage value obtained by dividing a sum of a voltage value of a maximum voltage output by the drive signal output circuit and a voltage value of a minimum voltage output by the drive signal output circuit by 2.

6. A print head that receives a drive signal output by a drive signal output circuit and ejects a liquid, wherein the drive signal output circuit includes a modulation circuit that outputs a modulation signal obtained by modulating a basic drive signal, an amplification circuit that outputs an amplification modulation signal obtained by amplifying the modulation signal, a smoothing circuit that outputs the drive signal obtained by smoothing the amplification modulation signal, a feedback circuit that feeds the drive signal back to the modulation circuit, and a basic drive signal output circuit that outputs the basic drive signal that is corrected based on temperature information output by the print head and is a basis of the drive signal, the print head comprises:

a piezoelectric element that includes a first electrode, a second electrode, and a piezoelectric body and in which the piezoelectric body is located between the first electrode and the second electrode in a stacking direction in which the first electrode, the second electrode, and the piezoelectric body are stacked, and that is driven by receiving the drive signal, a vibration plate that is located on one side of the stacking direction with respect to the piezoelectric element and is deformed by driving the piezoelectric element, a pressure chamber substrate that is located on the one side of the stacking direction with respect to the vibration plate and is provided with a plurality of pressure chambers of which volumes change due to deformation of the vibration plate, a switch circuit that switches whether or not to supply the drive signal to the piezoelectric element, a wiring substrate that is provided with the switch circuit, and a temperature detection portion that is located on the other side of the stacking direction with respect to the vibration plate, is electrically coupled to the wiring substrate, and detects the temperature information of the pressure chamber, and a frequency of the amplification modulation signal when the temperature information detected by the temperature detection portion is output to the basic drive signal output circuit is higher than a frequency of the amplification modulation signal when the temperature information detected by the temperature detection portion is not output to the basic drive signal output circuit.

7. The print head according to claim 6, wherein at least a part of the temperature detection portion is stacked on the vibration plate.

8. The print head according to claim 6, wherein the temperature information detected by the temperature detection portion in a period in which the drive signal output circuit outputs the drive signal having a constant voltage value is output to the basic drive signal output circuit.

9. The print head according to according to claim 6, wherein the temperature information detected by the temperature detection portion when the frequency of the amplification modulation signal is the maximum is output to the basic drive signal output circuit.

10. The print head according to claim 6, wherein the temperature information detected by the temperature detection portion when a voltage value of the drive signal is a voltage value obtained by dividing a sum of a voltage value of a maximum voltage output by the drive signal output circuit and a voltage value of a minimum voltage output by the drive signal output circuit by 2 is output to the basic drive signal output circuit.

* * * * *